(12) United States Patent
Chang et al.

(10) Patent No.: US 7,406,434 B1
(45) Date of Patent: Jul. 29, 2008

(54) SYSTEM AND METHOD FOR IMPROVING THE PERFORMANCE OF ELECTRONIC MEDIA ADVERTISING CAMPAIGNS THROUGH MULTI-ATTRIBUTE ANALYSIS AND OPTIMIZATION

(75) Inventors: E. Diane Chang, Mountain View, CA (US); Richard E. Chatwin, Mountain View, CA (US); Sachin Kumar, Eagan, MN (US); Sanjay Ranka, Cupertino, CA (US); James R. Weisinger, Belmont, CA (US); Jason Lenderman, Los Angeles, CA (US)

(73) Assignee: Carl Meyer, Saratoga, CA (US)

( * ) Notice: Subject to any disclaimer, the term of this patent is extended or adjusted under 35 U.S.C. 154(b) by 893 days.

(21) Appl. No.: 10/024,449

(22) Filed: Dec. 17, 2001

Related U.S. Application Data

(60) Provisional application No. 60/318,221, filed on Sep. 7, 2001, provisional application No. 60/255,949, filed on Dec. 15, 2000, provisional application No. 60/255,939, filed on Dec. 15, 2000.

(51) Int. Cl.
*G06Q 99/00* (2006.01)
(52) U.S. Cl. .................. 705/10; 705/7; 705/14
(58) Field of Classification Search .............. 705/10
See application file for complete search history.

(56) References Cited

U.S. PATENT DOCUMENTS

| | | | |
|---|---|---|---|
| 5,617,538 A | 4/1997 | Heller | |
| 5,727,129 A | 3/1998 | Barrett et al. | |
| 5,809,481 A | 9/1998 | Baron et al. | |
| 5,848,397 A | 12/1998 | Marsh et al. | |
| 5,873,068 A | 2/1999 | Beaumont et al. | |
| 5,884,305 A | 3/1999 | Kleinberg et al. | |
| 5,937,037 A | 8/1999 | Kamel et al. | |
| 5,937,392 A | 8/1999 | Alberts | |
| 6,006,197 A * | 12/1999 | d'Eon et al. | ................ 705/10 |
| 6,128,651 A | 10/2000 | Cezar | |
| 6,161,127 A | 12/2000 | Cezar et al. | |
| 6,182,059 B1 | 1/2001 | Angotti et al. | |

(Continued)

OTHER PUBLICATIONS

Romano, Catherine, The new Gold Rush?, Nov. 1995, Management Review, v84n11, pp. 19-24 [Dialog: File 15].*

(Continued)

*Primary Examiner*—Andre Boyce
(74) *Attorney, Agent, or Firm*—David H. Judson

(57) ABSTRACT

Automated system, methods, algorithms, procedures, and computer software programs and computer program products for improving and optimizing the performance of messaging campaigns, particularly for marketing campaigns in which advertisements or other messages are distributed over an interactive measurable medium such as the Internet. Analysis and Optimization method and procedure, an automated system, and system and method that exploit the underlying multi-attribute structure, as well as other features and advantages. Optimization procedures allocate the ad alternatives or other message to the customer population to optimize business objectives such as maximizing the number of positive responses received. Procedure for generating message allocations that improve and attempt to optimize the campaign performance. Methods ensure that campaign constraints are not violated. Methods can be implemented on a computer that is programmed to retrieve message performance information and to generate recommended message allocations for each stage in a multi-stage messaging campaign to achieve messaging goals.

62 Claims, 1 Drawing Sheet

U.S. PATENT DOCUMENTS

| | | | | |
|---|---|---|---|---|
| 6,836,773 | B2 * | 12/2004 | Tamayo et al. | 707/6 |
| 6,895,387 | B1 * | 5/2005 | Roberts et al. | 705/14 |
| 6,954,731 | B1 * | 10/2005 | Montague | 705/10 |
| 7,039,599 | B2 * | 5/2006 | Merriman et al. | 705/14 |
| 7,100,111 | B2 * | 8/2006 | McElfresh et al. | 715/207 |
| 2002/0010757 | A1 * | 1/2002 | Granik et al. | 709/218 |
| 2002/0042739 | A1 * | 4/2002 | Srinivasan et al. | 705/14 |
| 2002/0099600 | A1 * | 7/2002 | Merriman et al. | 705/14 |
| 2002/0103698 | A1 * | 8/2002 | Cantrell | 705/14 |
| 2002/0188508 | A1 * | 12/2002 | Lee et al. | 705/14 |
| 2003/0229537 | A1 * | 12/2003 | Dunning et al. | 705/10 |

OTHER PUBLICATIONS

Campbell, Lisa, Net worth. (Internet advertising), May 28, 1998, Marketing, p. 39(4) [Dialog: File 148].*

* cited by examiner

US 7,406,434 B1

SYSTEM AND METHOD FOR IMPROVING THE PERFORMANCE OF ELECTRONIC MEDIA ADVERTISING CAMPAIGNS THROUGH MULTI-ATTRIBUTE ANALYSIS AND OPTIMIZATION

RELATED APPLICATIONS

This application is based on and claims priority to Ser. No. 60/255,939, filed Dec. 15, 2000, Ser. No. 60/255,949, filed Dec. 15, 2000, and Ser. No. 60/318,221, filed Sep. 7, 2001.

FIELD OF THE INVENTION

This invention relates generally to systems, methods, algorithms, computer program products and operating models for improving and optimizing the performance of messages, advertisements and other content, and more particularly to systems, methods, algorithms, computer program programs and operating models for optimizing the performance of advertisements, splash pages, landing pages and other content and messages in an interactive measurable medium such as a global network of interconnected information devices and appliances, where an example of such a global network is the Internet.

BACKGROUND

When advertising on electronic media, advertisers and advertising agencies are able to receive immediate feedback as to the performance of their campaigns, based on how successful the creatives are in generating responses (such as clicks-visitors clicking on a banner advertisement to visit the advertiser's site—or post-click actions, such as making a purchase, signing up for a newsletter, joining a club, etc.). Further, these advertisers and agencies have significant flexibility in their ability to simultaneously run multiple advertisements (also called creative messages or creatives) within a campaign and to introduce new advertisements into an ongoing campaign. In particular, the advertiser or agency can exploit the placement allocation capabilities of ad servers to adjust the proportion of impressions in a campaign allocated to each advertisement. Even when one campaign ends and the next begins, the distinction between campaigns is oftentimes more contractual than defined by any difference in the creative messages comprising the campaigns. Therefore, a sequence of advertising campaigns can be thought of as one campaign in which the set of creative messages evolves as the advertiser or agency withdraws creatives that are no longer relevant or perform poorly and introduces new creatives. The decisions to withdraw old creative and introduce new creative are based on business decisions (such as the introduction of a new kind of marketing offer) or the performance of the creatives. The flexibility to add and withdraw creative and to adjust impression allocation across creatives provides advertisers and agencies with the opportunity to significantly enhance the performance of their advertising campaigns by diverting impressions to the better performing advertisements at the expense of the poorer performing advertisements.

Currently, when making performance-based decisions to withdraw or add creative from or to a campaign, advertisers and agencies have very little to guide them. While it is clear which of the existing creatives are performing poorly and are thus candidates for withdrawal, it is not clear what aspects of the successful creatives drive their success and hence should be considered for replication in new creatives. While long-time advertisers may develop some intuition for the types of creatives that are successful for them, this type of knowledge is by nature imprecise, hard to codify and maintain, and difficult to use to good advantage. Thus, the success or failure of new creative tends to be very much a random process. Likewise, the process of determining the allocation of impressions to advertisements is manual, tedious, imprecise and arbitrary. Typically, the advertiser or agency will review the performance of the advertising campaign on an infrequent basis and will adjust the allocations of impressions to advertisements in an arbitrary and not well-founded manner based on ad hoc rules. Even when the rules for allocating impressions to advertisements have some reasonable basis, these rules tend not to take advantage of all the information available from the performance data and tend to be applied only sporadically. These practices result in failure to achieve or even approach optimal campaign performance.

In many campaigns the likelihood that a visitor responds to an advertisement is driven by the particular elements ("attribute values") that comprise that advertisement. This insight could be used to provide information about successful attributes and values for use in determining which advertisements to show in order to increase the overall campaign performance. However, currently advertisers and agencies have no tools or methods that give them access to this type of analysis and knowledge, and hence the potential campaign performance improvements are inaccessible.

SUMMARY

The invention provides a system, methods, and computer software program and computer software program product for describing advertisements in terms of the key components, or attributes, of the advertisement. An "attribute" is a distinct element of an advertisement that is typically common to several advertisements within a campaign or across several campaigns. For example, attributes of banner advertisements include but are not limited to the graphic image, the text message, the background color, and the degree of animation. The nature of advertisements on electronic media dictates that the key attributes be limited in number. Each advertisement will take on a "value" for each of the defined attributes. An "attribute value" is a particular instantiation of an attribute. For example, if background color is an attribute, the attribute values of background color might be red, green, and blue. While a given attribute value might be common to several advertisements in a campaign, the advertisements will typically be distinguished by having different combinations of attribute values. The definition of attributes and their values and the assignment of attributes and values to advertisements is called a "multiattribute system."

The invention provides a system, methods, and computer software program and computer software program product for reducing any multiattribute system to a so-called "standard form." The process of reducing a multiattribute system to standard form may involve the elimination of certain attributes or attribute values which implies that the multiattribute system as defined does not support the measurement of the relative importance on creative element performance of the attributes and values that are removed.

Once an advertiser defines a multiattribute system and this system is reduced to standard form, the invention provides a method for determining the relative impact of each of the attributes and attribute values in driving the performance of the advertisements. This method uses past performance data in the form of numbers of impressions and various responses (such as clicks or post-click actions, the choice of which depends on the campaign goal as defined by the advertiser) together with the multiattribute system defined by the advertiser to derive the underlying drivers of campaign performance. Specifically, this method provides estimates of the distributions of future performance of the advertising campaign creative elements assuming the underlying performance model implied by the defined multiattribute system holds. Advertisers and agencies can use this information either on an ongoing basis as a campaign evolves to aid in the design of new advertisements or across campaigns to quantify and encode knowledge as to which attributes and attribute values have success in generating good advertisement performance to aid in designing advertisements for new campaigns.

The invention provides system, methods, and computer software program and computer software program product for addressing two issues related to the process of estimating the relative impacts of the attributes and their values from the observed performance data. First, the degree of confidence in the point estimates of the relative impacts will depend on the nature of the performance data itself, particularly on the number of impressions received. The invention provides a method for determining confidence intervals around the relative impact on advertisement performance of the different attributes and attribute values. Advertisers and agencies can use this information to temper the aggressiveness with which they act on the reported drivers of campaign performance. A narrow confidence interval suggests a high degree of confidence in the estimate and allows for more aggressive action whereas a wide confidence interval suggests a low degree of confidence and advocates a more cautious approach to, or delaying of any decision-making. Second, estimating the relative impacts of the attributes and their values involves fitting a model to the observed performance data. In some cases the fit can be very poor. The invention provides a method for determining when the fit is too poor to warrant reporting the relative impacts of the attributes and their values. If results are not reported, advertisers and agencies will know that they should not use information regarding the defined multiattribute system in making decisions regarding new creative. When the fit is good, the invention provides methods for reporting the results of the multiattribute analysis for assessment by the advertiser or agency.

Because the assumption that the underlying performance model holds can be very restrictive, the invention further provides a method for updating the estimates of the distributions of future performance of the advertising campaign creative elements, so that the assumption that the underlying performance model holds is relaxed but the defined multiattribute structure still contributes to the estimates. In this way the inventive system and method allows the defined multiattribute system to provide valuable input into the campaign creative elements performance estimation, without requiring that the observed performance data be a perfect or near-perfect fit to the underlying performance model implied by the defined multiattribute system.

Finally, the invention provides a system, methods, and computer software program and computer software program product for allocating future campaign impressions amongst the creative elements to maximize future expected campaign performance, where the allocations are based on the estimates of the distributions of future campaign performance of said creative elements.

By applying the methods of the invention on a regular basis throughout the advertising campaign, the advertiser or agency can achieve significant improvements in campaign performance. A typical application might be to apply the methods every day. Using the ad server reporting capabilities, campaign performance data in the form of impressions and clicks (or post-click actions as appropriate) is updated every day. Using this updated performance data, the methods of the invention are applied to recommend allocations of future impressions across the creative elements. These allocation recommendations are then trafficked to the ad server and the process is repeated the following day.

The inventive procedure may be applied to various messages including, for example, but not limited to: banner ads, emails, splash pages, home pages, jump pages, landing pages, pop-up windows, web pages, web layouts, media programming, media content, surveys, sales promotions, political campaign messages, polls, news headlines, headlines, ballot measures, ballot initiatives, public service announcements, sports scores, sports scores for a local, regional, collegiate, or amateur sports team or teams, and combinations of these, as well as other content.

DETAILED DESCRIPTION OF EMBODIMENTS

Figure 1:
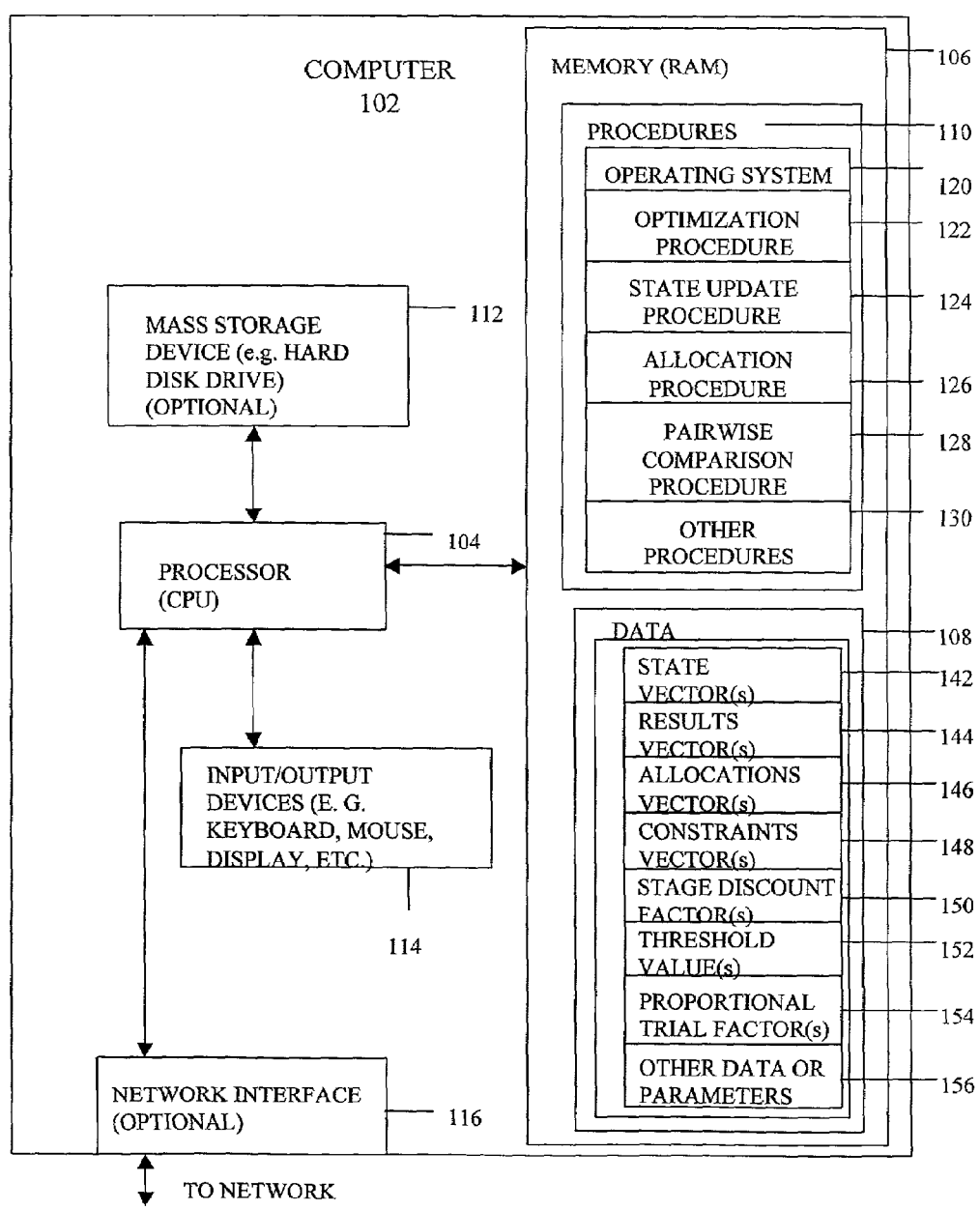
FIG. 1 is a diagrammatic illustration showing an exemplary embodiment of a computer system that may be used in conjunction with the inventive method, procedures, algorithms, and computer programs and computer program products.

The invention provides system, method, procedure, algorithms, and computer programs and computer program products (software and/or firmware) for monitoring and improving the performance of a message campaign communicated or conducted over an interactive measurable medium, such as the Internet.

Sectional headers provided in this document are merely for the purpose of assisting the reader in understanding where a primary description of a particular aspect or embodiment of the invention is described. It is understood that aspects of the invention are described throughout the text, drawings, and claims in this document and that the headers do not limit the description or scope of the invention in any way.

In this description of the invention, the term "optimizing" is used to describe the attempt to improve performance. However, those workers having ordinary skill in the art will appreciate that while there may be only a single "optimum" which may or may not always be attained, there are many degrees of performance improvement that may be obtained. As used in this description, optimization means improvement in performance as well as the attainment of any single optimum value. Put differently, optimization refers to methods, algorithms, and other attempts to attain optimum performance and does not require that the optimum performance be attained. (The optimization procedure used in this invention is described more fully later in this document.)

The invention provides optimization methods and algorithms that select (or select more frequently) and utilize one or more well performing message alternatives and deselect (or select less frequently) poorer performing message alternatives from among the available message alternatives based on the past performance of at least some of the other message alternatives. However, recognizing that a particular message alternative's performance may change (either improve or degrade) over time, in at least some embodiments of the invention even poorer performing message alternatives may be allocated some share of the total number of messages to be sent.

The inventive procedure tries or attempts to maximize performance. To achieve these benefits, the inventive procedure spreads messages to all or most of the message alternatives in the earlier stages, to discover high performing alternatives. As more information is available about the performance of these message alternatives, a higher concentration of messages is sent to better performing message alternatives, where better performing describes relative performance between the message alternatives sent. The inventive procedure can also robustly handle reasonable fluctuations in the underlying performance of a message alternative without deteriorating performance significantly. This latter characteristic is beneficial because performance of a message alternative may change over time due to seasonal fluctuations or other reasons.

Context for Application of the Invention

While the inventive methods may be applied to various message types, the description below for purposes of illustration focuses on advertising messages, and web site banner ads in particular. The general principles, methods and procedures, and parameters described relative to banner ads (or banners) apply as well to messages of other types and/or to other content types in interactive measurable digital environments.

Message types. The terms "banner ad" or "banner" or "ad" are used more generically for all message types including banner ads, where a particular "message" is selected from available message alternatives. In an analogous manner, an "email" is selected from available "email alternatives," a "pop-up window" is selected from available "pop-up window alternatives," a "web page" is selected from available "web page alternatives," and a "web layout" is selected from available "web layout alternatives." Using this syntax, a "banner ad" or "banner" is selected from "banner ad alternatives" or "banner alternatives." The phrases "message impression," "email impression", and "web page impression" though being analogous to "banner impression" have not been adopted in the field, rather the terms "email", "message", and "web page" themselves correspond to the impression. Those workers having ordinary skill in the art in light of the description provided here will appreciate that the system as described above can be easily extended to be applicable to other message types, including, for example, alternatives selected from a group consisting of: an email, a pop-up window, a web page, a web layout, an ad, a banner ad, a splash page, a home page, a jump page, a landing page, media programming, media content, a political campaign message, a survey, a poll, a news headline, a headline, a ballot measure, a ballot initiative, one or more sports scores, one or more sports scores for a local, regional, collegiate, or amateur sports team or teams, and combinations thereof.

Campaigns. A marketing or ad campaign involves a list of ad alternatives (a particular type of message alternative) and a target customer population. The goal of the marketer is to allocate the ad alternatives to the customer population to optimize business objectives such as maximizing the number of responses received. In an embodiment of the invention directed to advertising, the invention provides methods for deriving insight regarding the performance of marketing campaigns in which advertisements are distributed over an interactive, measurable medium such as the Internet. One particular type of ad that is a very popular type of advertisement is the Internet web site banner ad.

Banners. A banner ad, or more simply "banner," is a graphic image that announces the name or identity of a site or is an advertising image, and that the advertiser wants to have displayed at various categories of web sites. A category may correspond to a web site, or to different sections within a web site, where a section is a specific web page or a set of related web pages within the site. A category may also correspond to keywords searched by a visitor on a search engine. There will typically be a number of banners that an advertiser wishes to deploy across the categories at which advertising space has been purchased.

Impressions/click-throughs/post-click actions. The term "impression" is commonly used in the industry to refer to the occurrence of a banner ad on an Internet web site, i.e., an Internet visitor to the web site is shown the banner ad. A "click-through" or "click" occurs when a visitor to the web site clicks on a banner. This action redirects the visitor to a page on the advertiser's web site. A "post-click action" is a specific action taken by a visitor having been redirected to the advertiser's web site. Such actions might include making a purchase, signing up for a newsletter, or registering for the site. The impression, click (or lack thereof), and post-click action (or lack thereof) are all attributed to the banner ad that the visitor was shown. An advertiser will want to maximize the response to her campaign as measured by a rate such as the click-through rate (the number of clicks divided by the number of impressions) or the action rate (the number of post-click actions divided by the number of impressions) or indeed even the conversion rate (the number of post-click actions divided by the number of clicks). In the sequel we use the term "impressions" to apply generically to the events counted in the denominator of the advertiser's objective and the term "clicks" to apply generically to the events counted in the numerator of the advertiser's objective.

Stages. Impressions can occur at any time—whenever someone visits the appropriate page of a web site at which the banner ads are being displayed. However, the reports on banner ad performance are typically updated at discrete times. We will call the intermediate time between two reports a "stage". Among the many features that distinguish the inventive system and method from conventional ones, the inventive system and method are designed for repeated application at intervals of time corresponding to stages. Though they may be any arbitrary intervals of time, the stages are desirably regular intervals of time. For example stages may be 6-hour intervals, 12-hour intervals, one per day, one per week, or any other interval. It is not uncommon for a stage to correspond to a day, although, for example, if the advertising campaign is an email campaign, then the appropriate time interval for a stage might be a day or more than a day but more typically would be much shorter than a day. The choice for the length of a stage represents a trade off. Usually, the intervals should be long enough to allow collection of significant performance data, and not so long that important short-term trends may be missed.

In developing its reports and recommendations, one embodiment of the inventive procedure uses the available performance or response data from all prior stages in the message campaign. In another embodiment, the performance or response data from prior stages may be discarded after a predetermined number of stages have passed or the performance or response data may be weighted to increase the contribution for recent data and discount the contribution for older data. In either case, the inventive procedure seeks to maximize insight and performance.

In the description that follows, we will view a "stage" as a period of time. However, those workers having ordinary skill in the art will appreciate that the inventive method can also be applied to situations in which a stage is defined by a number of visitors (equivalently, number of impressions) or some other measure. For example, a performance report could be generated after each visitor (equivalently, after each impression) and reports on the relative impacts of attributes and attribute values, and optimized banner allocation for the next visitor could be based on this most recent report.

Targeting. While the description of the invention focuses on the analysis and optimization of an advertising campaign at an individual site, the invention can also learn and optimize across the various other parameters that are available for configuration of advertising campaigns. While the primary relevant information will be the outcomes for each visitor to each advertisement, there will often be additional data available. This information may include, by way of example, but not limitation:

Data based on the current visit. Examples of this type of profiling information include the time of the visit, the type of browser used by the visitor, the IP address, the site where the advertisement was shown and the like.

Data based on an earlier visit. An example is data from a registration form that was filled out by the visitor on an earlier visit. This may include demographic and psychographic information.

Data from external sources. Examples include an external customer database that may provide data on the purchase history of the visitor. This may, for example, include demographic and/or psychographic information.

The visitor profile space includes and generally consists of a multidimensional space where each dimension corresponds to one of the above profiling attributes. Visitors are often classified into market segments based on this data. For example, segments based on age or income might be defined. A visitor segment consists of a portion of the visitor profile space. By applying the inventive system and method to each visitor segment in turn, for example, by using multiattribute optimization to select different advertisements for different visitor profiles, the overall campaign performance can be improved. The visitor segments can be derived from the observed data rather than pre-specified to further enhance campaign performance. This can be achieved using the methods described in U.S. Patent Application Ser. No. 60/255,949 filed Dec. 15, 2000 entitled Method, Algorithm, and Computer Program for Targeting Messages Including Advertisements in an Interactive Measurable Medium, which is hereby incorporated by reference.

As the inventive method is advantageously implemented as a computer program or computer program product on a general-purpose computer, such as for example a computer operating in an Internet or other network server environment, attention is now directed to an exemplary computer system illustrated in FIG. 1 that may be used in conjunction with the inventive methods, procedures, computer software programs, and computer program products.

A computer 102 includes a processor or CPU 104 coupled to a fast random access memory 106 storing data 108 and procedures 110. Processor or CPU 104 is also conveniently coupled to one or more mass storage device 112 such as one or more hard disk drives of which many types are known. The mass storage devices may typically store information in one or more databases. In the context of the present invention, such databases may store performance data, allocation data, and other data and/or procedures or algorithms that are not currently being processed by the processor 104 or memory 106. Input/output devices 114 may also be conveniently coupled to the processor or other computer system 102 components for inputting data to the computer, retrieving results from the computer, monitoring activity on the computer or on other network devices coupled to the computer, or other operations as are known in the art. A network interface 116, such as a network interface card (NIC), modem, or the like is also conveniently provided.

Procedures 110 may for example, include an operating system 120, an optimization procedure 122, a state vector update procedure 124, a message allocation procedure 126, a pair-wise or other message alternative comparison procedure 128, as well as other procedures and algorithms 130. Data 108 may for example include one or more state vector 142, results vector 144, allocations vector 146, constraints list or constraints items 148, stage discount factors or parameters 150, threshold values 152, proportional of impressions or trials factors 154, or other data or parameters 156.

Those workers having ordinary skill in the art in light of the description provided here and in FIG. 1 will appreciate that the computer system 102 described here is merely exemplary and that various modifications may be made, or that other computer system architectures may be used in conjunction with the inventive systems, methods, and computer software programs.

Having discussed the inventive system and how the system can be implemented, attention is now directed to the details of a particular embodiment of the inventive optimization procedure.

Input Data

Performance data. The performance data may include one or more of, for each banner ad in the campaign: (1) the number of impressions delivered to date, and (2) the number of clicks (or post-click actions) generated to date. Typically, in the course of a campaign impression and click data is recorded during every stage (such as a day) of the campaign. In general, we will be interested in only the cumulative impressions and clicks for each banner ad, but in some cases we may want to adapt the per stage data before combining it, in which case the per stage performance data must be available.

Adapting the performance data-discounting. In some cases, it may be advantageous to use instead of the raw performance data itself, some function of the performance data. The major motivation for this is to discount older data. In the context of banner ads, experience demonstrates that banner ad performance may improve or deteriorate over time. So, generally the performance of a banner ad is non-stationary in a statistical sense. There are a number of potential reasons for a banner to have non-stationary behavior in the underlying performance. For example, a banner that promises overnight delivery may be quite effective shortly before Christmas, but much less effective on the day after Christmas. Even absent a particular identifiable event, the performance of ads may change over time. For example, Internet visitors may see a given banner too many times and beyond some point the banner loses all attraction. As the fraction of visitors who have seen the ad too many times increases the performance of the banner deteriorates.

A discounting scheme may be implemented in the form of a binary step function where data older than a certain stage is simply ignored, in the form of a linear or non-linear weighting function, or according to any other weighting or discounting scheme. In one embodiment, the discount is in the form of a geometrical discounting, that is, at the end of each stage all data (such as, for example, the number of impressions and number of clicks) is multiplied by a one-stage discount factor beta, $\beta$, where beta is a number less than one ($\beta<1$). Thus, data that is n stages old at the time when the procedure is executed will end up being multiplied by beta raised to the $n^{th}$ power ($\beta^n$). In this manner newer performance data is weighted more highly than older performance data.

While not true in all circumstances, it is generally true that newer performance data provides better guidance as to the future performance of a banner than does older performance data. In any particular situation where this generalization does not hold true, different discounting schemes, including for example a discounting scheme that weights some segment of performance data more heavily than newer performance data, may be applied. If no discounting is desired, beta may be set to 1 ($\beta=1$). (Empirical and simulation studies have shown that a value of the one-stage discount factor (beta) of about 0.9 works well for a range of synthetic and real data sets, though values between about 0 and about 1 may be used, more typically between about 0.5 and 0.99, more usually between about 0.8 and about 1.0, and even more usually between about 0.85 and 0.95 may be used.)

Discounting procedures. To describe the discounting procedures, let $c_i(t)$ denote the total number of discounted cumulative clicks and $n_i(t)$ denote the discounted cumulative number of impressions for banner i at the end of stage t. Let $imp_i(t)$ denote the total number of impressions and $click_i(t)$ represent the total number of clicks and impressions for a particular banner i in stage t. Then the discounted cumulative clicks $c_i(t)$ and the discounted cumulative impressions $n_i(t)$ are given by the following expressions:

$$c_i(t) = \beta c_i(t-1) + click_i(t), \text{ for } t \geq 1;$$

$$n_i(t) = \beta n_i(t-1) + imp_i(t), \text{ for } t \geq 1;$$

where $c_i(0)=0$ and $n_i(0)=0$. Discounting reduces the impact of old data and allows the inventive algorithm to be more responsive to new data that may reflect changes in the click-through rates or other performance indicators.

The above expressions are specialized for an embodiment in which the performance metrics are based on numbers of "impressions" and "click-throughs," where for a particular ad impression the viewer has the binary choice of either clicking-though or not clicking through for each impression.

In the set of equations above, the discounting is provided by the factor $\beta$. The above expressions can be easily generalized to arbitrary or generalized discounting functions $G_s\{\ldots\}$ and $G_n\{\ldots\}$ which use the click-throughs and impressions from the previous stages to derive the discounted cumulative clicks $c_i(t)$ and the discounted cumulative impressions $n_i(t)$ using the following expressions:

$$c_i(t) = G_s\{click_i(1), \ldots, click_i(t-1), click_i(t), imp_i(1), \ldots, imp_i(t-1), imp_i(t)\}, \text{ for } t \geq 1;$$

$$n_i(t) = G_n\{click_i(1), \ldots, click_i(t-1), click_i(t), imp_i(1), \ldots, imp_i(t-1), imp_i(t)\}, \text{ for } t \geq 1;$$

where $c_i(0)=0$ and $n_i(0)=0$. In these generalized discounting functions $G_s\{\ldots\}$ and $G_n\{\ldots\}$, it is noted that none, some, or all, of the $click_i(t)$ and/or $imp_i(t)$ may actually weighted or discounted.

In particular, functions which give more weight to more recent values of $c_i$ and $n_i$ are of special interest. When a different binary response performance indicator than click-throughs such as positive responses or "successes" are used, and a more general term applied to impressions such as "trials" is used, along with generalized discounting functions $H_s\{\ldots\}$ and $H_n\{\ldots\}$, the general expressions for the total number of discounted successes $c_i(t)$ and the cumulative number of trials $n_i(t)$ are given by the following expressions:

$$c_i(t) = H_s\{success_i(1), \ldots, success_i(t-1), success_i(t), trial_i(1), \ldots, trial_i(t-1), trial_i(t)\}, \text{ for } t \geq 1;$$

$$n_i(t) = H_n\{success_i(1), \ldots, success_i(t-1), success_i(t), trial_i(1), \ldots, trial_i(t-1), trial_i(t)\}, \text{ for } t \geq 1;$$

where $c_i(0)=0$ and $n_i(0)=0$. Here, $s_i(t)$ and $n_i(t)$ represent the state vector for banner i. As noted above for $G\{\ldots\}$, none, some, or all, of the $success_i(t)$ and/or $trial_i(t)$ may actually be weighted or discounted by the discounting function $H\{\ldots\}$, though in the preferred embodiment each is discounted.

Prior information or judgement. When an advertising campaign is started fresh, a campaign manager may have used some of the banners in an earlier campaign or may have a prior judgment about the performance of the banners. In this case the value of $c_i(0)$ and $n_i(0)$ for banner i can be set as follows. The manager can provide an estimate of the average performance, means, for banner i over the previous campaigns. He/she may decide that the information from the previous campaign is worth $N_i$ impressions. In this case $c_i(0)$ can be set to (mean$_i \times N_i$) and $n_i(0)$ can be set to $N_i$.

The setting of $c_i(0)$ and $n_i(0)$ as described above can be used to incorporate a manager's prior experience or judgment of the performance of the banners. Larger values of $N_i$ imply that the manager is more confident about extrapolating the future performance of the banner based on his prior experience or judgment.

Those workers having ordinary skill in the art in light of the description provided here will appreciate that there are several similar variations of the above basic strategy.

Updating the performance data. Typically, in the course of a campaign the performance data set will be updated during every stage. (Some campaigns may also review performance data and determine that no update is required at a particular stage.) The update procedure involves the first and possibly (optionally) the second of the following two steps. First, the most recent performance data as observed or recorded during the latest stage (for example, the clicks and impressions for each banner for the previous 24 hours as recorded by the ad server serving the campaign) will be added to the database of performance data. In general the complete performance data set for all banners and all stages through the current stage, including any prior information or judgment, is the input data set to the inventive system and method. Second, optionally in accordance with one specific embodiment of the invention, a discounting procedure is applied to the updated performance data set to compute the total number of discounted cumulative clicks $c_i(t)$ and the total number of discounted cumulative impressions $n_i(t)$ for each banner i at the end of the current stage t. In this embodiment the invention, the $c_i(t)$ and the $n_i(t)$ for all banners i and for the current stage t comprise a sufficient data set for computation of the multiattribute analysis and optimization.

Multiattribute System

One construct of the inventive system, method and computer program and computer program product is the multiattribute system, which we now define, although first we provide an informal description to explain the concepts.

The methods of the invention described herein take advantage of the observation that in many advertising campaigns the likelihood that a visitor clicks on a banner is driven by the attribute values that comprise that banner. This insight can be used to provide information about successful attributes and values for use in designing new banners for addition to the campaign or for inclusion in future campaigns.

A banner can often be thought of as being composed of one attribute value for each of several attributes. It is common for a group of banners to share the same combination of attributes but to be distinguished by having different combinations of banner attribute values. It is also possible for two (or more) groups of banners to share some common attributes but to have some attributes that are not common between the two groups. For example, consider a banner advertising campaign consisting of 13 banner ads running on Internet web sites. For this set of ads, the marketing manager identifies three attributes, background color, degree of animation, and marketing message. The attribute values for the attribute background color are red, green, and blue; the attribute values for the attribute degree of animation are static and animated; and the attribute values for the attribute marketing message are "$10 off" and "Free shipping". The marketing manager divides the thirteen banners into three groups consisting of six, six, and one banners, respectively. The first set of six banner ads has in common the attributes of background color and animation, the second set of six has in common the attributes of background color and marketing message, while the thirteenth banner does not share any of these attributes. Typically, each set of six banners would exhibit the six possible combinations of the two common attribute values although this is not necessary and it is possible to have so-called "duplicate ads" that share the same value for each attribute. Table 1 gives an example of attribute values exhibited by the thirteen banner ads. A blank entry indicates that attribute is not present for that banner ad.

TABLE 1

| Banner ad | Attribute value for Attribute 1 Background color | Attribute value for Attribute 2 Animation | Attribute value for Attribute 3 Marketing message |
|---|---|---|---|
| 1 | 1 = Red | 1 = Static | |
| 2 | 2 = Green | 1 = Static | |
| 3 | 3 = Blue | 1 = Static | |
| 4 | 1 = Red | 2 = Animation | |
| 5 | 2 = Green | 2 = Animation | |
| 6 | 3 = Blue | 2 = Animation | |
| 7 | 1 = Red | | 1 = "$10 off" |
| 8 | 2 = Green | | 1 = "$10 off" |
| 9 | 3 = Blue | | 1 = "$10 off" |
| 10 | 1 = Red | | 2 = "Free shipping" |
| 11 | 2 = Green | | 2 = "Free shipping" |
| 12 | 3 = Blue | | 1 = "$10 off" |
| 13 | | | |

A multiattribute structure is defined to be a collection of attributes. In a campaign the marketing manager should define multiattribute structures so that each banner ad can be assigned in the obvious way to exactly one multiattribute structure. In the example of Table 1, the marketing manager defines three multiattribute structures, one consisting of the attributes background color and degree of animation, one consisting of the attributes background color and marketing message, and one containing no attributes (this last is called the "singleton" multiattribute structure). Table 2 and Table 3 show the multiattribute structure and assignment of banner ads for the first two multiattribute structures.

TABLE 2

Example 1 of multiattribute structure

| | | Background color | | |
|---|---|---|---|---|
| | | Red | Green | Blue |
| Degree of animation | Static | Ad 1 | Ad 2 | Ad 3 |
| | Animated | Ad 4 | Ad 5 | Ad 6 |

In this first example all combinations of attribute values for background color and degree of animation are represented by the six banner ads assigned to the multiattribute structure. The inventive system and method applies even when all combinations are represented by some ad, provided that certain conditions are met. The inventive system and method provides a method for converting any multiattribute system to "standard form" (to be defined formally below) in which the necessary conditions are guaranteed to be satisfied. Table 3 shows an example of an assignment of ads to a multiattribute structure such that two ads are duplicates and that one combination of attribute values is not represented by any ad.

TABLE 3

Example 2 of multiattribute structure with duplicate and missing ads

| | | Background color | | |
|---|---|---|---|---|
| | | Red | Green | Blue |
| Marketing message | "$10 off" | Ad 7 | Ad 8 | Ad 9 Ad 12 |
| | "Free shipping" | Ad 10 | Ad 11 | |

Identifying such an attribute structure can benefit the advertiser in two ways. First, in the context of the current campaign, the attribute structure can be used to help the advertiser more efficiently optimize the campaign, i.e., allocate the ad alternatives to the customer population to optimize business objectives. Second, in the context of both the current and future campaigns, the attribute structure can be used to help the advertiser to identify ads or elements of ads that are successful in generating customer response, so that the advertiser can more easily and more successfully develop new ads for insertion into the current campaign or a set of ad alternatives for future campaigns.

The methods and procedures of the invention are designed to elicit both of these benefits and are applied to a defined multiattribute system, which we now formally define.

Multiattribute system definition. We assume that the marketing manager or advertising campaign manager has defined a "multiattribute system." Defining a multiattribute system requires that the marketing manager group the banners in a campaign into one or more multiattribute structures, i.e., the marketing manager must define attributes, attribute values for each attribute, multiattribute structures, assignment of banners to multiattribute structures, and assignment of attribute values to banners, as follows:

Attributes. An "attribute" is a distinct element of a banner that is typically common to several banners within a campaign or across several campaigns. In the context of banner ads in an Internet advertising campaign, examples of attributes of banners (banner attributes) include but are not limited to the graphic image, the text message, the background color, and the degree of animation.

Attribute values for each attribute. An "attribute value" is a particular instantiation of the attribute of which it is a value. For example, if background color is a banner attribute, attribute values of background color might be red, green, and blue. While a given attribute value might be common to several banners in a campaign, the banners will typically be distinguished by having different combinations of attribute values.

Multiattribute structures. Each multiattribute structure is a collection of attributes. The "singleton" multiattribute structure is the null collection, i.e., does not have any attributes in it.

Assignment of banners to multiattribute structures. Each banner should be assigned to exactly one multiattribute structure. A banner that is not assigned to any multiattribute structure is by default assigned to the singleton structure.

Assignment of attribute values to banners. For each banner, the marketing manager should assign exactly one value of every attribute that comprises the multiattribute structure of which the banner is a member.

Standard form for multiattribute systems. A multiattribute system is said to be of "standard form" if it satisfies the following properties:

Attributes in multiattribute structures. Every multiattribute structure, except the "singleton" multiattribute structure, consists of two or more attributes.

Attribute values for each attribute. Every attribute has at least two values.

Assignment of attribute values to banners. For every attribute in each multiattribute structure, at least two attribute values are assigned to banners in that multiattribute structure.

Assignment of banners to multiattribute structures. The multiattribute-mapping matrix (see equation (3) below) for each multiattribute structure must be of full column rank. This will typically be the case if the number of "unique" banners (i.e., non-duplicate banners) assigned to each multiattribute structure is at least as many as the number of multiattribute parameters for that structure. The number of multiattribute parameters is computed as 1+#(attribute values assigned to banners in the multiattribute structure)−#(attributes in the multiattribute structure). However, while this condition is necessary, it is not sufficient to ensure that the multiattribute-mapping matrix is of full column rank. A more detailed check is required, and can be performed using standard matrix manipulation techniques such as Gaussian elimination.

Reduction of a multiattribute system to standard form. Every multiattribute system can be reduced to standard form through the following steps:

Remove attributes with too few values. Any attribute with fewer than two values is deleted and removed from any structure to which it was assigned.

Remove attributes from structures with too few values assigned to banners. Any attribute in a multiattribute structure having less than two values assigned to banners is removed from that multiattribute structure.

Remove multiattribute structures with too few attributes. Any multiattribute structure consisting of fewer than two attributes, except the "singleton" multiattribute structure, is deleted. All banners assigned to this multiattribute structure are reassigned to the singleton structure.

Remove multiattribute structures with multiattribute-mapping matrices that are not of full column rank. If the multiattribute-mapping matrix for a multiattribute structure is not of full column rank, the structure is deleted. All banners assigned to this multiattribute structure are reassigned to the singleton structure.

The multiattribute analysis and optimization invention requires that the marketing manager define a multiattribute system and as a first step reduces the defined multiattribute system to standard form. Thus, in the multiattribute system defined by the marketing manager we do not enforce that there be any particular number of multiattribute structures, that any multiattribute structure have any particular number of member ads, that every attribute be a member of at least one multiattribute structure, or that every attribute value be assigned to some banner. We do allow "duplicate" banners, i.e., two banners that have the same combination of attribute values. The remainder of the description of the invention assumes that we are discussing a multiattribute system in standard form.

Application of the Invention

The invention applies to a multiattribute system together with the performance data for the banners of the multiattribute system. Here the performance data refers to a pair (c, n) for each banner, where c represents the cumulative (or some other function) of clicks or post-click actions and n represents the cumulative (or some other function) of impressions. Typically, the inventive system and method is applied repeatedly, usually on a stage-by-stage basis as additional performance data is gathered and the performance data is updated as described above. We describe the application of the invention to a multiattribute system in standard form because any defined multiattribute system can be reduced to standard form as described above.

Formulation of the Mathematical Model

Background. For each banner i, let $\pi_i$ represent the measure of the performance of the banner along the performance dimension that the marketing manager would like to maximize. In one embodiment of the inventive system and method $\pi_i$ represents the click-through rate of banner i. However, in general the inventive system and method applies to any performance measure: (a) whose value can be computed directly from the performance data; and (b) whose random variable converges in distribution to a Normal distribution as the number of impressions grows. For example, consider the embodiment in which i represents the click-through rate of banner i. Assuming that the process of a visitor either clicking or not clicking on a banner can be represented by a Bernoulli process, the number of clicks observed in a given number of impressions has a Binomial distribution. When the number of impressions is large, this Binomial distribution is approximated by a Normal distribution. Because the observed click-through rate is simply the number of clicks divided by the number of impressions, we can conclude that the distribution of $\pi_i$ converges to a Normal distribution as the number of impressions grows. Application of such limiting distribution theory and of the Central Limit Theorem and the delta method will ensure that many reasonable functions and transformations of the performance data satisfy both conditions (a) and (b) above, and hence are amenable to application of the inventive system and method.

Focus for the time being on a particular multiattribute structure (that is not the singleton structure). For any attribute m and banner i, let i(m) represent the attribute value of attribute m assumed by banner i. The key assumption employed by the inventive system and method is that there exists a known, continuous, almost everywhere differentiable, strictly increasing function f and there exists a set of parameters $\beta^m_{jk}$ for every attribute m and pair of attribute values j and k, such that if h and i are any pair of banners, then (identifying $\beta^m_{jj}=0$ for every attribute m and attribute value j) the equation $$f(\pi_h)-f(\pi_i)=\Sigma_m \beta^m_{h(m)i(m)} \qquad (1)$$

either i) holds as a given; or ii) defines our prior (before reviewing the input data) expectation of the differences $f(\pi_h)-f(\pi_i)$. The function f is called the "multiattribute function".

It follows immediately from (1) that for any attribute m and pair of attribute values j and k, $\beta^m_{jk}=-\beta^m_{kj}$, and that for any three attribute values j, k, and l of a common attribute m:

$$\beta^m_{jl}=\beta^m_{jk}+\beta^m_{kl}.$$

Therefore we can re-parameterize in the following manner. Arbitrarily select one of the ads as the so-called "base ad" (suppose this is labeled ad 1 and without loss of generality suppose that this ad has the first attribute value for each attribute). Define $\beta_1 = f(\pi_1)$ and $\beta''_j = \beta'''_{jl}$ for all attribute values j>1 and attributes m. Then it follows directly from (1) that:

$$f(\pi_i) = \beta_1 + \Sigma_m \beta'''_{i(m)} \quad (2)$$

for all banner ads i. Equation (2) can be rewritten in vector notation by creating the column vectors $f(\pi)$ (with entries $f(\pi_i)$ for each banner i) and $\beta$ (with entries $\beta_1$ and $\beta'''_j$ for each attribute m and attribute value j>1), $$f(\pi) = X\beta \quad (3).$$

We call X the "multiattribute-mapping matrix" and $\beta$ the vector of "multiattribute parameters". Define $\theta_i = f(\pi_i)$ for every banner i, so that the vector $\theta = f(\pi)$. Then $\theta = X\beta$.

As an example, consider Example 1 of a multiattribute structure as defined in Table 2. Let Ad 1 be the base ad. The attribute values assigned to the base ad (red and static) are called the base values. Multiattribute parameters are assigned to the base ad and to every attribute value that is not a base value. Thus the number of multiattribute parameters can be computed as 1+#attribute values−#attributes. The $\beta_i = 1, 2, 3, 4$ in Table 4 are the multiattribute parameters for Example 1.

TABLE 4

Multiattribute parameters for Example 1

|  |  |  | Background color | |
|---|---|---|---|---|
|  | Base ad ($\beta_1$) | Red (0) | Green ($\beta_2$) | Blue ($\beta_3$) |
| Degree of animation | Static (0) | Ad 1 | Ad 2 | Ad 3 |
|  | Animated ($\beta_4$) | Ad 4 | Ad 5 | Ad 6 |

In Example 1, the multiattribute-mapping matrix X is $$\begin{bmatrix} 1 & 0 & 0 & 0 \\ 1 & 1 & 0 & 0 \\ 1 & 0 & 1 & 0 \\ 1 & 0 & 0 & 1 \\ 1 & 1 & 0 & 1 \\ 1 & 0 & 1 & 1 \end{bmatrix}$$

Thus, for example:

$\theta_5 = \beta_1 + \beta_2 + \beta_4$.

The situation in Example 2 of Table 3 is similar but different because of the duplicate and missing ads. Here let Ad 7 be the base ad and label the multiattribute parameters $\beta_i$, i=5, 6, 7, 8 in Table 5.

TABLE 5

Multiattribute parameters for Example 2

|  |  |  | Background color | |
|---|---|---|---|---|
|  | Base ad ($\beta_5$) | Red (0) | Green ($\beta_6$) | Blue ($\beta_7$) |
| Marketing message | "$10 off" (0) | Ad 7 | Ad 8 | Ad 9 |
|  |  |  |  | Ad 12 |
|  | "Free shipping" ($\beta_8$) | Ad 10 | Ad 11 |  |

Here Ads 9 and 12 are duplicates because they share the same combination of attribute values. In this situation the multiattribute optimization and analysis invention proceeds by combining the performance data (discounted clicks and impressions) for all the duplicate ads and proceeding as if there were only one such ad. Effectively, the duplicate ads are combined into one new ad and the analysis proceeds with the new ad but without the duplicate ads. Any conclusions from the analysis regarding the new ad are applied equally to all the duplicate ads that comprise the new ad. In Example 2, Ads 9 and 12 are combined into a new ad, Ad 14. Thus the rows of the multiattribute-mapping matrix for this multiattribute structure correspond to Ads 7, 8, 10, 11, and 14. X is then:

$$\begin{bmatrix} 1 & 0 & 0 & 0 \\ 1 & 1 & 0 & 0 \\ 1 & 0 & 0 & 1 \\ 1 & 1 & 0 & 1 \\ 1 & 0 & 1 & 0 \end{bmatrix}$$

The multiattribute analysis and optimization invention provides methods for estimating the values of the multiattribute parameters $\beta$ and also, via the multiattribute mapping matrix, the parameters $\theta$ and the performance metrics $\pi$ of the banner ads. The invention also provides methods for determining our confidence in those estimates. The estimates and the corresponding confidence intervals of the multiattribute parameters $\beta$ determine the relative impact on banner performance between each pair of attribute values of a common attribute for each attribute. Therefore, reporting these values (or some function thereof) can help the advertiser to identify ads or elements of ads that are successful in generating customer response, so that the advertiser can more easily and more successfully develop new ads for insertion into the current campaign or a set of ad alternatives for future campaigns. Likewise, the estimates (and confidence intervals around the estimates) of $\theta$ and $\pi$ can be used to define a prior distribution on banner performance. In this way the multiattribute structure helps to determine more refined estimates of banner performance, which enables the advertiser to more efficiently optimize the campaign by allocating the ad alternatives to the customer population so as to optimize business objectives.

Relationship of the outlined approach to the Logit Choice Model. Some of the logic underlying the inventive system and method is related to the widely used Logit Choice Model. In the Logit Choice Model, consumers for products are assumed to place utilities on the different values of the attributes of the products. The overall utility a consumer places on a product is the sum of the utilities that the consumer places on values of the attributes. When choosing between two products, the consumer is not assumed to always choose the one for which she has higher utility. Rather the choice is assumed to be probabilistic with the probability that the consumer chooses product 1 for which she has utility $u_1$ over product 2 for which she has utility $u_2$ given by $\exp\{u_1\}/(\exp\{u_1\}+\exp\{u_2\})$.

Now an important choice in a consumer's consideration set is not to choose any of the available products, i.e., to not make a purchase. This so-called no purchase option can be modeled by including an additional attribute with two values, purchase and no purchase. Every product takes on the purchase value of this attribute but we must also include a dummy product that represents the consumer's choice to not purchase any of the products. This product is modeled by the no purchase attribute value and arbitary (but fixed) values of the other attributes (we assume these to be the base values for each of the other attributes). We set the utility of the no purchase attribute value to be 0. Then the utility of the purchase attribute value is the utility of the base product—call this u. The probability that the consumer, given a choice between purchasing the base product and making no purchase, chooses to purchase the base product is given by $$\exp\{u\}/(1+\exp\{u\}).$$

In the context of banner ads, the banners are the products. The visitors viewing a banner do not choose between banners, rather they choose whether or not to click on the banner. In this context, clicking equates to purchasing and the visitor never chooses between two banners, but rather always chooses between clicking and not clicking on a banner. If a visitor has utility θ for a banner, then the probability π that that visitor clicks on that banner is $$\pi = \exp\{\theta\}/(1+\exp\{\theta\}),$$

or equivalently, $$\theta = \ln\{\pi(1-\pi)\} \quad (4).$$

Thus, θ represents the logodds for the banner. The particular embodiment of the invention in which the performance metric of interest is the click-through rate and the multiattribute function is the logodds function as defined in equation (4) represents a logit choice model. Note that, in this embodiment of the invention the click/no click attribute is implicitly part of the attribute structure but is not defined explicitly. Because of this relationship to the logit choice model we will sometimes refer to equation (3) as defining the "logistic" model, even when the performance metric of interest is other than the click-through rate of the banners (or equivalent).

Estimation of Multiattribute Parameters

The multiattribute analysis and optimization invention provides methods for using the data (discounted clicks and impressions for each banner ad) to find β*, an estimate of the multiattribute parameters β, and the associated covariance matrix V of β*. We can use this information to report on the relative importance of the values of an attribute, and on the relative importance of the attributes themselves.

We now describe the methods employed by the invention for using the data to estimate the multiattribute parameters. Let $P^n$ represent the vector of random variables, one for each banner, of the value taken on in the performance data by the chosen performance metric, where n is the total number of impressions in the performance data. The inventive system and method assumes that:

$$\sqrt{(n)}(P^n - \pi) \to^d N(0, \Psi) \quad (5),$$

where Ψ is a diagonal matrix where the $i^{th}$ diagonal element may depend on the underlying performance metric $\pi_i$ and the number of impressions on banner i in the performance data. Let $Q^n$ represent the vector of random variables, one for each banner, of the value taken on in the performance data by the multiattribute function of the chosen performance metric, where n is the total number of impressions in the performance data. It follows that (by the delta method):

$$\sqrt{(n)}[Q^n - X\beta] \to^d N(0, n\Sigma) \quad (6),$$

where again Σ is a diagonal matrix where the $i^{th}$ diagonal element may depend on the underlying performance metric $\pi_i$ and the number of impressions on banner i in the performance data. We can use equation (6) together with the performance data to derive estimates for β, θ, and π, and confidence intervals around those estimates. The estimation can be achieved through standard statistical techniques such as may be found in the relevant literature. For example, two alternative approaches are maximum likelihood estimation (ML) and weighted least squares (WLS). When the logistic model (3) holds, both estimators are asymptotically equivalent, both being in the class of best asymptotically normal estimators. For large samples, the estimators are approximately normally distributed around the parameter value, and the ratio of their variances converges to 1. The algorithm for computing the ML estimates (the Fisher scoring method for generalized linear models) is an iterative application of WLS. Given all of this the two methods can be expected to perform very similarly, especially when there is a lot of data. The ML is generally considered more accurate with limited amounts of data whereas the WLS is computationally simpler. Because the ML approach is iterative, it is not always guaranteed to converge, so the WLS is likely to be computationally more robust.

Multiattribute Analysis—Overview

The purpose of the components of the inventive system and method relating to multiattribute analysis is to help the advertiser to identify ads or elements of ads that are successful in generating customer response, so that the advertiser can more easily and more successfully develop new ads for insertion into the current campaign or a set of ad alternatives for future campaigns.

Given a multiattribute system and a campaign objective as defined by the advertiser and performance data through the current stage, the inventive system and method estimates the values of the multiattribute parameters (and confidence intervals thereon) for every multiattribute structure (except the singleton structure) in the standard form of the defined multiattribute system. The estimates can be computed using the methods described in the previous section. The values of the multiattribute parameters can be interpreted as defining the relative impact of the attribute values, and by extension of the attributes, on the performance of the banner ads.

The estimates of the multiattribute parameters are computed under the assumption that the performance model (3) holds. If this is the case, or is close to being the case, then the estimates will provide accurate insight into the relative impacts of the attribute values and attributes on the banner ad performance. However, if the assumption that the performance model (3) holds is far from the truth, then the estimates can be very misleading. Therefore the invention provides a method to assess the goodness of fit of the underlying performance model proposed by (3). If the fit is not close, the method recommends rejecting the performance model (3) as a good explanation for the observed data and hence not using the parameter estimates to draw any conclusions regarding the performance of the banners. This test is described in the following section.

Finally, the invention includes methods for reporting the estimates and confidence intervals on the multiattribute parameters for easy interpretation by the advertiser. These methods are described below as part of a description of the typical steps involved in conducting a multiattribute analysis using the inventive system and method.

Multiattribute Analysis—Test for Acceptance/Rejection of the Performance Model

The invention provides a method to assess the goodness of fit of the underlying performance model proposed by (3). Having computed the estimates of the multiattribute parameters, this test determines how closely the estimates and performance model (3) fit the observed data. If the fit is not close, the method recommends rejecting the performance model as a good explanation for the observed data and hence not using the parameter estimates to draw any conclusions regarding the performance of the banners.

The test employed is a summary deviance or likelihood ratio test. The test statistic is −2 times the logarithm of the likelihood ratio between a given model and the saturated model and is called the summary deviance statistic. The basic idea in the summary deviance measure is to assess the distance between the observed and model values via a function of residual measures. The residuals used are called deviance residuals. The sum, over all ads, of the squares of these residuals is the summary deviance D. We provide a description of the test for the specific embodiment in which the performance metric π represents the click-through rates of the banners and the multiattribute function is the logodds function so that θ represents the logodds of the banners. Those having ordinary skill in the art will recognize that similar goodness of fit tests apply when π and θ take on alternative interpretations.

Given our estimate of the multiattribute parameters β*, the estimated logodds θ* are computed using (3). Then the estimated click-through rates π* are simply computed as $\pi_i^*=1/(1+\exp\{-\theta_i^*\})$. For each ad i, the deviance residual is given by $$d_i = \pm\sqrt{\{2[c_i \ln(c_i/n_i\pi_i^*)+(n_i-c_i)\ln((n_i-c_i)/n_i(1-\pi_i^*))]\}},$$

where the sign of $d_i$ is the same as the sign of $(c_i-(n_i\pi_i^*))$. If $n_i>0$ and $c_i=0$, then $$d_i = -\sqrt{\{2n_i|\ln(1-\pi_i^*)|\}},$$

and if $n_i=c_i$, then $$d_i = \sqrt{\{2[c_i|\ln(\pi_i^*)|\}}.$$

The summary deviance statistic D is given by:

$$D=\Sigma_i(d_i)^2.$$

For large sample sizes (and a couple of other conditions that will almost always be satisfied in practice), the statistic D has, under the assumption that the model is correct, approximately a chi-square distribution with degrees of freedom equal to #multiattribute ads −#multiattribute parameters.

Large values of D represent evidence of lack of fit. The proposed threshold (which when exceeded by D causes us to reject the hypothesis of logistic fit) achieves three desirable properties: stability across simulations; discriminatory power over data that is far from logistic; and scalability with respect the degrees of freedom and expected number of clicks (total number of impressions×average ad clickthrough rate).

To set the thresholds we ran several simulations with different numbers of attributes and levels and average and maximum clickthrough-rates. The click-through rates were chosen to fit the logistic structure but then a normally distributed noise term was added to each ad's logodds every day. The variance on the noise dictates how far from logistic the data is. We ran simulations with no, low and high noise. These simulations showed that with a relatively small number of observed clicks (across all the ads), the statistic D does not discriminate well between data drawn from a logistic model (no noise) and data that we know is far from logistic (high noise). In this situation the method will always recommend accepting the logistic model. Further, as more and more clicks are observed, the discriminatory power of the test becomes greater and greater. If we simply set the threshold to be the 95$^{th}$ percentile of a chi-square distribution with the appropriate degrees of freedom, then the test's ability to reject data that is far from logistic (high noise) increases with the number of observed clicks. However, we also find that the test will reject data that is close to logistic (low noise) more and more frequently as the number of observed clicks increases. Because the purpose of the test is to reject data sets that are very far from logistic, rather than to tell us we have enough data to reject the logistic model even when the data is close to logistic, i.e., we would like to report the results of the multiattribute analysis when the data is close to logistic (even when we have enough data to reject the logistic model at the 95% confidence level), we adjust the threshold so that data drawn from a model close to logistic will pass the test 95% of the time, regardless of the number of clicks observed or of the number of degrees of freedom.

One exemplary way in which an adjusted threshold T might be computed is as follows. Let $T^0$ be the 95$^{th}$ percentile of a chi-square distribution with the appropriate degrees of freedom. Suppose we have observed C clicks across all the ads. Then we choose parameters a, b, d, e, and C* and compute $$m=a(\exp\{bC\}-1)+d, \text{ and}$$

$$c=eC.$$

Then $$T=mT^0+c.$$

We reject the logistic model if we have observed at least C* clicks across all the ads and D>T.

With a test of the kind just described, data drawn from a logistic model will pass the test in nearly 100% of cases. Data that is far from logistic will pass the test with decreasing frequency as the number of observed clicks increases.

Multiattribute Analysis—Process Flow

We now provide more information about the process flow involved in conducting the multiattribute analysis. The first two steps should happen infrequently; the remaining steps might be repeated once during every stage (such as on a daily basis) as updated performance data becomes available.

Advertiser defines Multiattribute System. The advertiser defines the multiattribute structures, the attributes and their values, assigns attributes and banners to multiattribute structures, and assigns values to banners.

Reduce Multiattribute System to Standard Form. The multiattribute system defined by the advertiser is reduced to standard form.

Advertiser provides Performance Data. The advertiser provides performance data in the form of click and impression data (or more generally, success and trial data) for each banner during every stage.

Process Performance Data. The performance data is processed by a discounting function to produce cumulative or weighted clicks and impressions (or more generally, successes and trials) for every banner.

Advertiser requests Multiattribute Report. The advertiser requests a report on the results of the multiattribute analysis for one of the multiattribute structures.

The remaining steps assume a focus on the particular multiattribute structure for which the advertiser requests the report.

Combine duplicate ads. Duplicate ads are combined into one by adding their clicks and impressions.

Determine whether Multiattribute Structure is Appropriate for Conducting Multiattribute Analysis. To obtain a unique solution for the values of the multiattribute parameters, the multiattribute structure must have a sufficient number of ads and in the appropriate configuration. This will be the case if and only if the multiattribute mapping matrix X has at least as many rows as columns (equivalently, #multiattribute parameters≦#ads in the structure) and has full column rank. If these conditions are not met, then the advertiser is informed that the multiattribute analysis cannot be conducted. Otherwise, the analysis proceeds with the next step.

Arbitrarily select the base ad. Estimate multiattribute parameters. We arbitrarily select one of the ads to be the base ad. The attribute values assigned to this ad will have their utilities fixed at 0. The estimates of the multiattribute parameters can now be computed using standard statistical techniques such as the WLS or the ML approach.

Set base ad to be worst ad. Re-estimate multiattribute parameters. If any of the parameter estimates turn out to be negative, the base ad arbitrarily chosen in the previous step is not the worst-performing ad, at least according to our estimates. For aesthetic reasons it is preferable to present results with all estimates being non-negative, so we repeat the parameter estimation except that this time we set the previously estimated worst ad to be the base ad. This will ensure that all the new parameter estimates are non-negative.

Compute confidence intervals around multiattribute parameter estimates. Along with the parameter estimates, most estimation techniques (including the WLS and ML approaches) will produce a covariance matrix around the parameter estimates that can be used to define confidence intervals around the parameter estimates.

Compute revised parameter estimates and revised confidence intervals. Because it is preferable to show reports in which the results have some tangible interpretation, it may be advisable to revise the parameter estimates and upper and lower confidence bounds before reporting them. In the particular embodiment of the invention in which $\pi$ represents the click-through rates of the banners and $\theta$ represents the logodds of the banners, this can be achieved as follows. If u is a parameter estimate (or associated upper or lower bound), then the revised parameter estimate is computed as $100*(\exp\{u\}-1)$. The logic behind this transformation is as follows. Consider the background color attribute in the example illustrated in Table 2. Here Red is the worst value; it has a parameter estimate set to 0. Suppose we compare Ad 1 with Ad 2. Ad 1 is the base ad. Ad 2 differs from Ad 1 only in that it has the attribute value Green rather than the attribute value Red for the attribute background color. The underlying logodds of the two ads are estimated as $q_1=\beta_1$ and $q_2=\beta_1+\beta_2$. Thus the underlying click-through rates for the two ads are estimated as:

$$p_1=\exp\{\beta_1\}/(1+\exp\{\beta_1\}) \text{ and } p_2=\exp\{\beta_1+\beta_2\}/(1+\exp\{\beta_1+\beta_2\}).$$

In general we expect the response to banners to be very small. For example, it is commonly accepted that the average click-through rate for banner ads on the Web is approximately 0.4%. It follows that the exponentiated parameter estimates must also be small, so we can approximate the underlying click-through rates as:

$$p_1=\exp\{\beta_1\} \text{ and } p_2=\exp\{\beta_1+\beta_2\}.$$

The percentage improvement in click-through rate that would be achieved by showing Ad 2 rather than Ad 1 is then:

$$100*(p_2-p_1)/p_1=100*(p_2/p_1-1)=100*(\exp\{\beta_2\}-1),$$

which is estimated precisely by the revised parameter estimate for the attribute value Green. (Note that we would also get this result if we compared Ad 4 with Ad 5.) Therefore, the revised parameter estimate for the attribute value Green represents the percentage improvement in click-through rate that would be achieved by showing an ad with the attribute value Green rather than an ad with the worst value of the attribute, in this case Red (where the values of all the other attributes are shared by the two ads). This then provides a tangible interpretation for the revised parameter estimates.

Perform Acceptance/Rejection Test. To determine whether the observed data supports the assumption of the performance model (3), we perform an acceptance/rejection test as described above. In the particular embodiment of the invention in which $\pi$ represents the click-through rates of the banners and $\theta$ represents the logodds of the banners, the test involves two parts: 1) checking whether the total number of clicks (or more generally, post-click actions) exceeds a threshold; and 2) checking whether the summary deviance statistic falls below a threshold. The results of this test are used to determine what or how to report the results of the multiattribute analysis. In Case 1, when the first part of the check fails, the reports are displayed but a disclaimer is shown indicating that the results are not statistically significant. In Case 2, when the first part of the test passes but the second part fails, the reports are not displayed but a message indicating that the observed data does not support the assumption of the underlying logistic model is displayed. In Case 3, when both parts of the test pass, the reports are displayed with no covering message.

Report the Results. In the particular embodiment of the invention in which $\pi$ represents the click-through rates of the banners and $\theta$ represents the logodds of the banners, one embodiment of the invention includes two types of multiattribute report, one comparing the attributes, and one comparing the values of a particular attribute. Each report contains both a bar chart and a table. The bars in the bar charts indicate the relative importance of either the attributes or the attribute values. The invention includes three alternative coloring schemes for the bars in the bar charts.

Coloring Scheme 1. Each attribute is assigned a color. Whenever that attribute or a value of that attribute appears on a chart, its bar is colored appropriately.

Coloring Scheme 2. Each bar is one of two colors, reflecting whether the results indicate that the difference between the best and worst values of the attribute (for the attribute report) or the difference between the attribute value and the worst value of that attribute (for the attribute values report) is significant (say, green) or not (say, red). The bar is colored red if the lower confidence bound for the best attribute value (for the attribute report) or the attribute value (for the attribute values report) is less than zero, otherwise it is colored green.

Coloring Scheme 3. Each attribute is assigned a color. On the attribute report, whenever that attribute appears on a chart, its bar is colored appropriately. Each attribute value is assigned a variant of the color assigned to the attribute of which the attribute value is a value. Whenever that attribute value appears on a chart, its bar is colored appropriately.

Relative Importance of Attributes Report. This report compares the attributes defined in the multiattribute structure, and in particular reports on the relative importance of each attribute in determining the click-through rates achieved by the ads. The report comprises both a chart and a table. Details of the chart are:

| | |
|---|---|
| Chart-type: | Horizontal bar chart |
| Title: | "Relative Importance of Attributes Report" |
| y-axis label: | Attribute names |
| x-axis label: | "% improvement in <Click-through Rate> (best value vs. worst value)" where the term "Click-through Rate" may be replaced by the name of the appropriate post-click metric |
| Color: | Each bar takes on the color of its associated attribute, so each is a different color (assuming Coloring Scheme 1 is employed). |

The length of the bar for an attribute is determined by selecting the largest of the revised parameter estimates for the values of the attribute. As explained above, this represents the percentage improvement in click-through rate that would be achieved by showing an ad with the best value of the attribute rather than an ad with the worst value of the attribute (where the values of all the other attributes are shared by the two ads).

The table contains one row for each attribute. The columns of the table are:
1. "Attribute name"
2. "Lower confidence bound". This shows the revised lower bound for the largest of the revised parameter estimates for the values of the attribute
3. "% improvement in <Click-through Rate> (best value vs. worst value)", where the term "Click-through Rate" may be replaced by the name of the appropriate post-click metric. This shows the largest of the revised parameter estimates for the values of the attribute
4. "Upper confidence bound". This shows the revised upper bound for the largest of the revised parameter estimates for the values of the attribute.

Relative Importance of Values for an Attribute Report. This report compares the values of an attribute and in particular reports on the relative importance of each attribute value in determining the click-through rates achieved by the ads. The report comprises both a chart and a table. Details of the chart are:

| | |
|---|---|
| Chart-type: | Horizontal bar chart |
| Title: | "Relative Importance of Values for <Attribute Name> Report" |
| y-axis label: | Attribute value names |
| x-axis label: | "% improvement in <Click-through Rate> (vs. worst value)" where the term "Click-through Rate" may be replaced by the name of the appropriate post-click metric |
| Color: | Each bar takes on the color of the attribute of which it is a value, so all are the same color (assuming Coloring Scheme 1 is employed). |

The length of the bar for an attribute value is determined by the revised parameter estimate for that value. This represents the percentage improvement in click-through rate that would be achieved by showing an ad with this attribute value rather than an ad with the worst value of the attribute (where the values of all the other attributes are shared by the two ads). Note the length of the bar for the best attribute value will be the same as the length of the bar for this attribute in the attribute report described above.

The table contains one row for each value of the attribute. The columns of the table are:
1. "Attribute value name"
2. "Lower confidence bound". This shows the revised lower bound for the revised parameter estimate of the attribute value
3. "% improvement in <Click-through Rate> (vs. worst value)", where the term "Click-through Rate" may be replaced by the name of the appropriate post-click metric. This shows the revised parameter estimate for the attribute value
4. "Upper confidence bound". This shows the revised upper bound for the revised parameter estimate of the attribute value.

Multiattribute Optimization—Overview

When running a conventional online marketing campaign, a marketing manager might typically employ an ad server to deliver the advertisements comprising the campaign. The ad server typically provides the marketing manager with some parameters to configure the delivery and tracking of the campaign. Reports on the performance of visitors on or to a site in response to the campaign advertisements are manually analyzed by trained analysis personnel to derive new, improved delivery configurations. Typically, these configurations consist of allocations of advertisements—the fraction of available visitors that are allocated to each advertisement. In particular, some advertisements may be turned off (allocated no visitors) when the analysis personnel determine them to be underperforming. This manual process is tedious and error-prone and has an inherent delay between the period of data collection and the time new configurations are implemented because of the large amount of data to be analyzed and the potentially large number of parameters to be modified. Even if errors are not made and the user is able to overcome the tedium of the process, it is unlikely to yield optimal or even near-optimal recommendations for advertisement configurations. This is especially true in light of the typical delay—between a day and a week—between data collection, analysis, and a new campaign configuration based on the analysis. Campaign reconfiguration is in essence a multi-dimensional optimization problem, that by-and-large cannot be timely solved using conventional tools, methods, or systems. Furthermore, optimizations on multiple dimensions are impractical to do manually and exacerbate the time delay between data collection and reconfiguration.

The inventive system and method overcomes the difficulties just outlined by providing an automated methodology for optimizing and rapidly and efficiently executing allocation parameters. The inventive procedure is advantageously run at the end of each stage of an advertising campaign. It allocates the available banner impressions for the next stage among the available banners—that is, it generates a strategy or recommendation for displaying banners during the next stage of the campaign. In developing this recommendation, the method uses the results from all prior stages. (Though in at least one embodiment, a selected range of data from older stages may optionally be discarded, and in a different embodiment, not all data from all stages has the same weight or value in the recommendation.) One objective is to allocate the banners at all stages so that the total number of positive results, such as user click-throughs on a web site, recorded by all banners during the campaign is maximized. Other operations may optionally be performed—for example, during the ad campaign the client advertiser or marketing manager may wish to delete or add a banner.

While it is generally intended that performance data or results are received for each prior stage before allocations are generated for the current or next stage in the campaign, and the inventive procedure benefits from such timely receipt, the inventive system, method, and procedures do not require such timely receipt. In the event that expected prior stage results are not for some reason received as expected, the inventive procedures are sufficiently robust that the new allocations are merely based on the previous performance data or results. Therefore, when new performance results are not available, the old performance results are read or otherwise used in the computations. In some instances this may result in the same or substantially the same allocations as the previous stage, however, in an embodiment where data is weighted according to its date (discounting), the allocations may not be the same. The extent of the difference may typically depend upon the discounting function and the historical prior performance results to which the discounting is applied.

Optimization. In this description of the invention, the term "optimizing" is used to describe the attempt to improve performance. However, those workers having ordinary skill in the art will appreciate that while there may be only a single "optimum" which may not always be attained, there are many degrees of performance improvement that may be obtained. As used in this description, optimization means improvement rather than requiring attainment of any single optimum value. Put differently, optimization refers to procedures, algorithms, and other attempts to attain optimum performance rather than requiring that the optimum performance be attained. (The optimization procedure used in this aspect of the invention is described more fully later in this document.)

Optimizing over stages. Among the many features that distinguish the inventive system and method from conventional ones, the invention provides a procedure that recommends and allocates messages to and among a plurality of different message alternatives at intervals of time. These intervals of time are referred to here as stages and though they may be any arbitrary intervals of time, the stages are desirably regular intervals of time. For example stages may be 6-hour intervals, 12-hour time intervals, one per day, one per week, or any other interval. Usually, the intervals should be long enough to allow collection of significant performance data, and not so long that important short-term trends may be missed.

In developing its recommendation and allocation, one embodiment of the inventive procedure uses the available performance or response data from all prior stages in the message campaign. In another embodiment, the performance or response data from prior stages may be discarded after a predetermined number of stages have passed or the performance or response data may be weighted to increase the contribution for recent data and discount the contribution for older data. In either case, the inventive procedure tries to maximize performance, which may be indicated by the total number of positive responses generated by the message set.

In the description that follows, we will view a "stage" as a period of time. However, those workers having ordinary skill in the art in light of the description provided here will appreciate that the inventive method can also be applied to situations in which a stage is defined by a number of visitors. For example, a performance report could be generated after each visitor and a banner allocation for the current visitor could be based on this most recent report. Whether stages are measured in time or visitors, the choice for the length of a stage represents a trade off. Stages should be long enough to permit the collection of significant performance data, but not so long that important short-term trends may be missed.

Performance. To achieve these benefits, the inventive procedure spreads messages to all or most of the message alternatives in the earlier stages, to discover high performing alternatives. As more information is available about the performance of these message alternatives, a higher concentration of messages is sent to better performing message alternatives, where better performing describes relative performance between the message alternatives sent. The inventive procedure can also robustly handle reasonable fluctuations in the underlying performance of a message alternative without deteriorating performance significantly. This later characteristic is beneficial because performance of a message alternative may change over time due to seasonal fluctuations or other reasons.

Empirical and heuristic evidence, including computer simulation, have demonstrated the effectiveness of the inventive procedure in improving performance over that achieved by simplistic allocation strategies. Some of these simplistic allocation strategies include, for example distributing the messages uniformly over all the different message alternatives or assigning most of the messages to the best performing message alternative up to that stage.

Multiattribute Optimization—Parameter Estimation

The inventive system and method uses estimates of the adjusted message performance $\theta$ (and the covariance of those estimates) in order to propose allocations of impressions to message alternatives, as will be described in the next section. This section describes the inventive procedures for computing $\theta^*$, the estimate of $\theta$, and C, the associated covariance matrix.

First, we can use the inventive procedures as described above to compute $\beta^*$ and V, the estimate of $\beta$ and the associated covariance matrix. Then the simplest approach to finding $\theta^*$ and C might be to take the values of $\beta^*$ and V together with equation (3) to obtain $\theta^*=X\beta^*$ and $C=XVX'$. However, this assumes that the performance structure represented by equation (3) holds. If the data suggest that the performance structure is not valid, then this approach could lead to poor estimates of $\theta$ and hence to poor allocation decisions. To avoid this scenario, the invention provides a method that employs a Bayesian approach in which uses (roughly speaking) $\theta^*=X\beta^*$ and $C=XVX'$ as the prior estimates of $\theta$ and the associated covariance, but allows the data to move the subsequent posterior estimates away from the defined performance structure if warranted.

Bayesian analysis. The inventive system and method employs Bayesian variants of the estimation procedures for computing $\beta^*$ and V described above. This allows the parameter estimates of $\theta^*$ and C to fall outside the performance space defined by (3) (so that if the underlying performance metric does not fit the performance structure (3) and the data reflects this, we are not forced to use estimates that do fit the performance structure). So instead of working in the performance space (of dimension #multiattribute parameters), we work in the larger saturated space (of dimension #multiattribute ads). However, we supply some external or prior information about the unknown parameters by saying that we expect them to fit the performance structure. This external information is modeled by a parametric prior density. Thus the parameters of the data density are not considered unknown constants but random variables.

Suppose that $\theta$ is a random vector with prior density $g(\theta)$. The posterior density $g(\theta|c)$ of $\theta$ given the data (observed clicks) c is related to the prior density by Bayes' theorem as:

$$g(\theta|c)=L(c;\theta)g(\theta)/\int L(c;\theta)g(\theta)d\theta \qquad (7).$$

We could then compute the posterior mean and associated posterior covariance matrix in the obvious way. Unfortunately, computing these involves computing integrals for which exact analytic solutions do not exist. Therefore, implementing this approach would require numerical or Monte Carlo integration, which is a non-trivial task because the integrals have the dimension of $\theta$.

Accordingly, we pursue an alternative approach called posterior mode estimation, which involves maximizing the posterior density of θ. Because the denominator of (7) is independent of θ, maximizing g(θ|c) is equivalent to maximizing L(c;θ) g(θ), or equivalently the posterior log likelihood (ignoring terms that are independent of θ)

$$l_p(\theta|c) = l(c;\theta) + \log g(\theta) \quad (8).$$

Suppose we assume a Normal prior density (we describe how to determine the prior density below) as follows:

$$\theta \sim N(\phi, K), K > 0 \quad (9).$$

Then (8) becomes:

$$l_p(\theta|c) = l(c;\theta) - \tfrac{1}{2}(\theta - \phi)' K^{-1}(\theta - \phi),$$

where we drop terms that are independent of θ. This can be maximized using standard techniques as described in the mathematical and statistical literature.

For large amounts of data, the posterior mode estimator $\theta_p^*$ becomes approximately Normal, as follows:

$$\theta_p^* \sim N(\theta, F_p^{-1}(\theta_p^*)) \quad (10).$$

Then the posterior mode and the expected curvature $F_p^{-1}(\theta_p^*)$ of $l_p(\theta|c)$, evaluated at the mode, are good approximations to the posterior mean and the covariance matrix.

Finally, we describe two preferred embodiments of the invention for finding the prior for the Bayesian approach. Those workers having ordinary skill in the art in light of the description provided here will recognize that there are many alternatives approaches to finding the prior for the Bayesian approach. The fundamental idea underpinning these methods is that the prior should reflect our expectation that the ads' adjusted performance measure θ fit the performance structure (3). We then use the data to find the posterior, which may be far removed from the performance structure (3) if the data does not fit the performance structure.

Finding the prior: First method. The prior is specified by the mean vector φ and the covariance matrix K as in (9). We follow these steps to compute the prior:

1. Choose a parameter A to be a positive integer. Obtain the adjusted clicks and impressions by multiplying the observed clicks and impressions by A/n so that the total number of adjusted impressions is A. In one embodiment of the invention the parameter A takes on the value 1000, but may take on other values
2. Use the adjusted data and one of the approaches described above to estimate the multiattribute parameters β* and their associated covariance matrix V assuming the performance structure holds.
3. Choose a parameter B to be a positive real number. Set φ=Xβ* and K=XVX'+BI. In one embodiment of the invention the parameter B takes on the value 0.01, but may take on other values Steps 1 and 3 described above benefit from some additional discussion. With respect to step 1, roughly speaking, in the posterior mode estimation the precision of the estimate $F_p(\theta_p^*)$ will be the sum of the precision of the observations and the precision of the prior. Now the former is based on the n observed impressions, so if the prior precision represents the equivalent of k observed impressions, then the posterior precision is based on n+k equivalent impressions. Because we want the estimate to be largely driven by the data, we want k to be small relative to n. We fix k to be A (in general A should be chosen so that we will observe more than A impressions, and usually many more than A impressions, over the course of a campaign at any buy-section). Hence, the data is desirably adjusted in step 1 above so that the total number of adjusted impressions is A. If we simply used the observed data in step 1, then the posterior precision would be based on 2n equivalent impressions and we might then be overstating our degree of confidence in the estimates.

With respect to step 3, once we obtain β* and V in step 2 we essentially have a distribution on θ in the (#multiattribute parameters)-dimensional "logistic subspace" of the (#multiattribute ads)-dimensional space. If, in step 3, we simply set the prior to be φ=Xβ* and K=XVX', then we would likely never be able to move outside the "logistic subspace" because the prior density has no (at least in a theoretical sense) support outside this subspace. Accordingly, we desirably add a little independent noise to each coordinate in the (#multiattribute ads)-dimensional space. Adding this noise gives the prior support outside the "logistic subspace". We arbitrarily set the size of the noise to be B along each coordinate.

This approach is similar to empirical Bayes analysis in which φ and K are considered unknown constants ("hyperparameters") that have to be estimated from the data.

Finding the prior: Second method. An alternative approach for setting the prior is to use a generic prior that has (close to) the performance structure (3). In this case we do not use the data to find the prior. Because we do not look at the data, we have no way of saying that any one ad should perform better than any other ad. Thus our prior sets all elements of θ to be equal by setting $\beta_i=0$ for all i>1. To find $\beta_1$, we do use the data to find the average performance measure of the ads, transform this using the multiattribute function and set $\beta_1$ to be the resulting value. Likewise, we assume we know nothing about the covariance of the multiattribute parameters and arbitrarily set the variance of each to be equal to a parameter D, i.e., V=DI. Then, φ=[$\beta_1$, ..., $\beta_1$]' and K=(D)XIX'+(E)I. In one embodiment of the invention the values of the parameters D and E are set such that D=10 and E=0.01.

One concern with this approach is that the diagonal elements of XIX' are not equal. This means that our prior places different variances around the estimates φ of different ads, even though we have no (formal) reason to assume such a thing. The approach could be modified so that instead of arbitrarily assuming that V=DI, we try to choose V to ensure that the variances on φ of each ad are the same. Other alternative modifications to the approach may also be considered.

Multiattribute Optimization—Allocation

The invention further provides a method for using the estimates of the adjusted performance measure for each banner and the covariance around these estimates to determine how to allocate impressions to banners.

Note that the computation of the estimates of the logodds described above focused on a single multiattribute structure. In the general case, when the multiattribute system includes or consists of several multiattribute structures including the singleton multiattribute structure, the methods described above can be applied to each multiattribute structure in turn to produce the estimates θ* and the covariance around these estimates C. Note that if two banners are part of different multiattribute structures, then the covariance between the estimates of those two banners' adjusted performance measures will be zero. Further, if two banners i and j are part of the singleton multiattribute structure, then their estimated adjusted performance measures will simply be the observed adjusted performance measures, the variance around those estimates will be functions of ($n_i$, $p_i$) and of ($n_j$, $p_j$) respectively, and the covariance between the estimates will be zero.

The allocation method determines for every banner whether that banner should be allocated or not. If the method determines that M of the N banners should be allocated, then those that are allocated will receive the fraction 1/M of the available impressions and those that are not allocated will receive no impressions. Instructions to an ad server to achieve such an allocation of impressions across banners are easy to encode on any ad server of note.

To determine whether a banner should be allocated or not, the allocation method conducts a pairwise comparison between every pair of banners. A banner that is "beaten" by any other banner in such a pairwise comparison is declared a non-contender. The contenders then are those banners that are not beaten by any other banner. All contenders are allocated, and all non-contenders are not.

Comparing two banners. The method for estimating the adjusted performance measures of the multiattribute banners assumes that the posterior of the distribution of the adjusted performance measures has a multivariate Normal distribution. This distribution is used to obtain a probability that the (true) adjusted performance measure for one banner majorizes the (true) adjusted performance measure of another banner.

Having applied the methods of the previous sections suppose that we obtain adjusted performance measures estimates $\theta^*$ and covariance around these estimates C. Then as in (10), we can assume that the approximate distribution of $\theta^*$ is $$\theta^* \sim N(0,C).$$

Suppose that $\theta_1^* > \theta_2^*$. The standard deviation of the posterior on the difference between these two adjusted performance measures is:

$$s_{12} = \sqrt{([1 -1 0 \ldots 0]C[1 -1 0 \ldots 0]')}.$$

Then the probability that the true difference between the adjusted performance measures of these two banners is greater than zero is given by $$P\{Z > (\theta_1^* - \theta_2^*)/s_{12}\}$$

where Z is distributed N(0, 1). We define the test statistic for the comparison of these two banners to be $z_{12} = (\theta_1^* - \theta_2^*)/s_{12}$.

Define a threshold $\alpha$ (typically $\alpha$ is set to 0.5 but can be as high as 1.1). For every pair of banners, compute the test statistic for that pair. If the test statistic exceeds $\alpha$, then declare the losing banner a non-contender. After all pairs of banners have been compared, any banner that has not been declared a non-contender is called a contender. Then every contender is allocated and every non-contender is not. This pairwise procedure guarantees that at least one contender will remain.

Extension to Handle Non-Stationarity

One advantageous characteristic about the Bayesian posterior mode estimation approach is that it can be easily modified to handle non-stationarity in the underlying performance metrics. Basically all we do is inflate the posterior covariance a little at each step. This corresponds to having the parameters of our model drifting around like a Brownian motion. The resulting method turns out to have some attributes analogous to those of a Kalman filter. (Though different, this has some features that are analogous to our current approach of using the performance structure (3) to find the prior but weighting the clicks and impressions so that the prior represents the equivalent of only A impressions worth of data.)

The method would proceed as follows. In the approach outlined above, we combine all of the data for a banner across the days (discounting clicks and impressions to handle non-stationarity) and then run the Bayesian algorithm to find the estimates of the banners' adjusted performance measures and the covariance thereon. Instead, we maintain the current estimate and covariance matrix every day. This would be the prior for the next days' update using that days' click and impression data, except that we would inflate the covariance matrix by a factor. This is in some ways equivalent to discounting the click and impression data (the estimate does not change but our confidence in it decreases). These two approaches may likely yield somewhat different results.

The foregoing description, for purposes of explanation, used specific nomenclature to provide a thorough understanding of the invention. However, it will be apparent to one skilled in the art in light of the description provided that the specific details are not required in order to practice the invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. All patents, publication, or other references referred to herein are hereby incorporated by reference.

We claim:

1. A method of multiattribute analysis and optimization for providing automated measurements of an importance of attributes and attribute values of message alternatives and, in an automated manner, for improving a stage-to-stage performance of the message alternatives in a multi-stage message campaign in an interactive measurable medium; the method comprising:
   obtaining historical information including historical performance data for message performance for at least one previous stage of the multi-stage message campaign;
   generating a multiattribute system that describes the message alternatives in terms of the attributes and the attribute values, wherein an attribute is an inherent characteristic of a message alternative and an attribute value is a particular instantiation of the attribute, wherein the multiattribute system is generated by grouping the message alternatives into one or more multiattribute structures, wherein each multiattribute structure is a collection of attributes and each message alternative is assigned to one and only one multiattribute structure or a null multiattribute structure, and wherein, for each such message alternative, there is one and only one attribute value for each attribute that comprises the multiattribute structure to which the message alternative is assigned;
   determining an importance of the attributes and the attribute values to the performance of the message alternatives;
   based on the determination of the importance of the attributes and the attribute values, optimizing campaign performance through allocation of message alternatives to visitors during the multi-stage message campaign; and
   determining a next allocation for each new visitor for a next stage of the campaign.

2. A method as in claim 1, further comprising: processing said historical performance data to identify erroneous or possibly erroneous or unusual historical performance data.

3. A method as in claim 2, wherein said processing further including cleaning said historical performance data to correct said identified erroneous or possible erroneous or unusual historical performance data.

4. A method as in claim 3, further comprising discounting at least a portion of said historical performance data from said at least one previous stage to grant more weight to more recent historical performance data than to less recent historical performance data.

5. A method as in claim 1, further comprising discounting at least a portion of said historical performance data from said at least one previous stage to grant more weight to more recent historical performance data than to less recent historical performance data.

6. A method as in claim 5, wherein said historical information further includes historical information selected from the set consisting of a visitor identifier, a message alternative identifier for the message alternative shown to said visitor, a type of action or types of actions taken by each said visitor, and a payoff for each of the actions taken by said visitors.

7. A method as in claim 1, wherein said historical information further includes historical information selected from the set consisting of a visitor identifier, a message alternative identifier for the message alternative shown to said visitor, a type of action or actions taken by each said visitor, and a payoff for each of the action or actions taken by said visitors.

8. A method as in claim 6, wherein said historical information further includes additional information selected from the set consisting of: a message type, a message type and a corresponding alternative clicked on by a visitor, a web site and a section of the web site where the visitor was presented with and saw or had an opportunity to see a banner ad, a time of the visitors visit, a visitor demographic information, a visitor psychographic information, a visitor demographic profile, a visitor psychographic profile, and combinations thereof.

9. A method as in claim 7, wherein said historical information further includes additional information selected from the set consisting of: a message type, a message type and a corresponding alternative clicked on by a visitor, a web site and a section of the web site where the visitor was presented with and saw or had an opportunity to see a banner ad, a time of the visitors visit, a visitor demographic information, a visitor psychographic information, a visitor demographic profile, a visitor psychographic profile, and combinations thereof.

10. A method as in claim 1, wherein said historical information includes additional information selected from the set consisting of: a message type, a message type and a corresponding alternative clicked on by a visitor, a web site and a section of the web site where the visitor was presented with and saw or had an opportunity to see a banner ad, a time of the visitors visit, a visitor demographic information, a visitor psychographic information, a visitor demographic profile, a visitor psychographic profile, and combinations thereof.

11. A method as in claim 1, further comprising:
processing said historical data to identify and correct any erroneous data;
discounting at least a portion of said performance data from said at least one previous stage to grant more weight to more recent performance data than to less recent performance data; and
said historical information further includes: information selected from the set consisting of: a visitor identifier, a message alternative identifier for the message alternative shown to said visitor, a type of action or actions taken by said visitor, and a payoff for each of the actions taken by said visitors, a message type, a message type and a corresponding alternative clicked on by a visitor, a web site and a section where the visitor was presented and saw a banner ad, a time of the visitors visit, a visitor demographic information, a visitor psychographic information, a visitor demographic profile, a visitor psychographic profile, and combinations thereof.

12. A method as in claim 11, wherein said message alternative is selected from a group of message alternatives consisting of: an email, an ad, a banner ad, a banner, a splash page, a home page, a jump page, a landing page, media programming, media content, a political campaign message, a survey, a poll, a news headline, a headline, a ballot measure, a ballot initiative, one or more sports scores, one or more sports scores for a local, regional, collegiate, or amateur sports team or teams, and combinations thereof.

13. A method as in claim 1, wherein said message alternative is selected from a group of message alternatives consisting of: an email, an ad, a banner ad, a splash page, a home page, a jump page, a landing page, media programming, media content, a political campaign message, a survey, a poll, a news headline, a headline, a ballot measure, a ballot initiative, one or more sports scores, one or more sports scores for a local, regional, collegiate, or amateur sports team or teams, and combinations thereof.

14. A method as in claim 1, wherein each exposure of a message alternative to a visitor results in a payoff result, a performance of said message alternative for a visitor segment being based at least in part on the expected value of the payoff results for the visitors for that visitor segment, said payoff result being a function of a measurement including at least one measurement selected from the set of measurements consisting of: a number of actions, a number of signups, a number of purchases, a binary result, a value of purchases, a revenue amount, a sales amount, a profit amount, a continuous function of a continuous variable, a continuous function of a discontinuous variable, a continuous function of a binary variable, a discrete function of a continuous variable, a discrete function of a discontinuous variable, a discrete function of a binary variable, and combinations thereof.

15. A method as in claim 12, wherein each exposure of a message alternative to a visitor results in a payoff result, a performance of said message alternative for a visitor segment being based at least in part on the expected value of the payoff results for the visitors for that visitor segment, said payoff result being a function of a measurement including at least one measurement selected from the set of measurements consisting of: a number of actions, a number of signups, a number of purchases, a binary result, a value of purchases, a revenue amount, a sales amount, a profit amount, a continuous function of a continuous variable, a continuous function of a discontinuous variable, a continuous function of a binary variable, a discrete function of a continuous variable, a discrete function of a discontinuous variable, a discrete function of a binary variable, and combinations thereof.

16. A method as in claim 14, wherein said multiattribute method comprises:
generating at least one report on an optimal value for each attribute;
generating new message alternatives with the values of each attribute indicated by a multiattribute analysis that uses prior expectations and payoff criteria to arrive at message alternative evaluation;
adding said new message alternatives to the set of available messages to be optimized; and choosing the best message alternative from among the choices presented and proactively creating message alternatives that are expected to perform well within some confidence level.

17. A method as in claim 16, wherein said multiattribute system is of standard form.

18. A method as in claim 16, wherein said multiattribute system is reduced to standard form.

19. A method as in claim 16, wherein said processing includes discounting said performance data; and said discounting being achieved using at least one of discounting scheme selected from the set of discounting schemes consisting of: a geometric discounting scheme, a linear weighting discounting scheme, a non-linear weighting discounting scheme, and combinations thereof.

20. A method as in claim 1, wherein said processing includes discounting said performance data; and said discounting being achieved using at least one of discounting scheme selected from the set consisting of: a geometric discounting scheme, a linear weighting discounting scheme, a non-linear weighting discounting scheme, and combinations thereof.

21. A method as in claim 19, wherein said processing includes estimating the distribution of the expected payoff of future performance of said message alternatives.

22. A method as in claim 21, wherein said estimate is obtained under the assumption that the underlying performance model implied by said multiattribute system holds.

23. A method as in claim 21, wherein said estimate is obtained by first estimating the distribution of expected payoff of future performance of said message alternatives assuming said underlying performance model implied by said multiattribute system holds, then updating the second said estimate to remove said assumption.

24. A method as in claim 21, wherein said estimate is employed for the purpose of allocating future campaign impressions amongst said message alternatives to optimize future expected campaign performance.

25. A method as in claim 19, wherein said allocation method comprises performing a pairwise comparison procedure among said plurality of message alternatives.

26. A method as in claim 25, wherein said pairwise comparison comprises:
computing an expected value of a payoff distribution of each message alternative and an error in said payoff distribution expected value; and
comparing in pairwise manner the expected value based statistic of a selected message alternative with the same expected value based statistic for each other of the message alternatives.

27. A method as in claim 26, wherein said pairwise comparison comprises:
selecting a first message alternative and a second message alternative from among said plurality of message alternatives;
computing a quotient determined as difference between the estimate of the said expected value divided by a standard error in the difference between the estimate of the expected value for each of said first and second message alternatives; and
determining if said difference is within a predetermined magnitude relationship of, including greater than, a threshold cutoff value $c_1$, and: (i) if said difference is within said predetermined magnitude relationship of said threshold cutoff value, then identifying the second selected message alternative as a member of a non-contending message class.

28. A method as in claim 27, wherein each message alternative is given content, the method further comprising:
repeating said selecting, said computing a quotient, said computing a difference, and said determining for other all other pairs of said message alternatives on a pairwise basis so that when all possible pairwise comparisons have been made each message alternative will have been sorted into one contender and said non-contender classes.

29. A method as in claim 28, further comprising performing said repeating for all other pairs of message alternatives on a pairwise basis for each optimization.

30. A method as in claim 28, wherein said pairwise comparison procedure further comprises initially uniformly allocating said message alternatives prior to performing a first optimization.

31. A method as in claim 27, wherein the message alternatives are sorted into a contender class and a non-contender class, and for at least one identified stage in a messaging campaign all visitors are allocated equally among message alternatives belonging to the contender class, and no visitors are allocated to message alternatives belonging to the non-contender class.

32. A method as in claim 31, wherein said at least one identified stage comprises an initial stage.

33. A method as in claim 31, wherein said at least one identified stage comprises a plurality of stages.

34. A method as in claim 31, wherein said at least one identified stage comprises all stages.

35. A method as in claim 25, wherein said allocation comprises a pairwise comparison, and message alternatives are sorted into more than two classes.

36. A method as in claim 35, wherein said messages belonging to each said class are assigned different numbers of visitors.

37. A method as in claim 35, wherein said messages belonging to each said class are assigned substantially the same numbers of visitors.

38. A method as in claim 25, wherein said allocation comprises a pairwise comparison, and message alternatives are sorted into more than two classes and the allocation among contenders is not equal.

39. A method as in claim 25, wherein said allocation comprises a pairwise comparison, and message alternatives are sorted into more than two classes and the allocation among non-contenders is not equal.

40. A method as in claim 25, wherein said allocation comprises a pairwise comparison, and message alternatives are sorted into more than two classes and the allocation among contenders is not equal and the allocation among non-contenders is not equal.

41. A method as in claim 27, wherein said allocation comprises a pairwise comparison, and the cutoff $c_1$ is in the range substantially between 0-1.0.

42. A method as in claim 27, wherein said allocation comprises a pairwise comparison, and the cutoff $c_1$ is substantially 0.5.

43. A method as in claim 27, wherein said allocation comprises a pairwise comparison, and the cutoff $c_1$ is greater than or equal to 1.

44. A method as in claim 27, wherein said allocation comprises a pairwise comparison, and the cutoff $c_1$ is greater than 1.

45. A method as in claim 16, wherein reports on the optimal value for each attribute are provided only if it is determined that said multiattribute system supports said measurement of the relative importance to said message alternative performance of said attributes and said attribute values.

46. A method as in claim 45, wherein said multiattribute system is reduced to standard form to determine if said multiattribute system supports said measurement of the relative importance to said message alternative performance of said attributes and said attribute values.

47. A method as in claim 45, wherein determination of said relative importance to said message alternative performance of said attributes and said attribute values includes determination of confidence intervals around said relative importance.

48. A method as in claim 16, wherein reports on the optimal value for each attribute are provided upon a given occurrence.

49. A method as in claim 48, wherein an acceptance/rejection test is employed upon a given occurrence.

50. A method as in claim 48, wherein reports on said relative importance to said message alternative performance of said attributes and said attribute values are provided to the marketing manager or other interested party.

51. A method as in claim 48, wherein determination of said relative importance to said message alternative performance of said attributes and said attribute values includes determination of confidence intervals around said relative importance.

52. A method as in claim 50, wherein said performance measurement represents click-through rates of the message alternatives, the multiattribute function is a logodds function, and the reported relative importance to the message alternative performance of one of the attribute values is computed as $100*(\exp\{u\}-1)$, where u represents a parameter estimate of a multiattribute parameter associated with the attribute value, and the reported relative importance to the message alternative performance of one of the attributes is computed as $100\times(\exp\{u\}-1)$, where u represents the largest parameter estimate of a multiattribute parameter associated with the attribute values of the attribute.

53. A method as in claim 52, wherein said reports include a chart and a table.

54. A method as in claim 53, wherein said chart is a bar chart where the length of the bars are determined by said reported relative importance of said attributes or said attribute values.

55. A method as in claim 54, wherein the colors of said bars are determined by assigning each attribute a color, and whenever an attribute or a value of said attribute appears on a chart, coloring said bar with said color.

56. A method as in claim 54, wherein the colors of said bars are determined by, when reporting on an attribute, using one color if the lower confidence bound of the best attribute value for said attribute is less than zero, and using a second color otherwise; and likewise when reporting on an attribute value, using one color if the lower confidence bound of said attribute value is less than zero, and using a second color otherwise.

57. A method as in claim 54, wherein the colors of said bars are determined by assigning each attribute a color and each attribute value a variant of the color assigned to its attribute, and whenever an attribute or an attribute value appears on a chart, coloring said bar with said color.

58. The method as described in claim 1 further including reducing the multiattribute system to a standard form such that (i) each multiattribute structure, except any null multiattribute structure, includes two or more attributes, (ii) each attribute includes at least two or more attribute values, (iii) for every attribute in each multiattribute structure at least two attribute values are assigned to message alternatives in that multiattribute structure, and (iv) a multiattribute mapping matrix for each multiattribute structure has full column rank.

59. A computer program product for use in conjunction with a computer system, the computer program product comprising a computer readable storage medium and a computer program mechanism embedded therein, the computer program mechanism comprising: a program module that directs the computer system and/or components thereof, to function in a specified manner to provide automated measurements of an importance of attributes and attribute values of message alternatives and, in an automated manner, to improve a stage-to-stage performance of the message alternatives in a multi-stage message campaign in an interactive measurable medium, the program module including instructions for:
 obtaining historical information including performance data for message performance for at least one previous stage of the multi-stage message campaign;
 generating a multiattribute system that describes the message alternatives in terms of the attributes and the attribute values, wherein an attribute is an inherent characteristic of a message alternative and an attribute value is a particular instantiation of the attribute, wherein the multiattribute system is generated by grouping the message alternatives into one or more multiattribute structures, wherein each multiattribute structure is a collection of attributes and each message alternative is assigned to one and only one multiattribute structure or a null multiattribute structure, and wherein, for each such message alternative, there is one and only one attribute value for each attribute that comprises the multiattribute structure to which the message alternative is assigned;
 determining an importance of the attributes and the attribute values to the performance of the message alternatives;
 based on the determination of the importance of the attributes and the attribute values, optimizing campaign performance through allocation of message alternatives to visitors during the multi-stage message campaign; and
 determining a next allocation for each new visitor for a next stage of the campaign.

60. A computer program product as in claim 59, wherein said program module further including instructions for:
 processing said historical data to identify and correct any erroneous data;
 discounting at least a portion of said performance data from said at least one previous stage to grant more weight to more recent performance data than to less recent performance data; and wherein:
 said historical information further includes additional information selected from the set consisting of: a visitor identifier, a message alternative identifier for the message alternative shown to said visitor, a type of action or actions taken by said visitor, and a payoff for each of the actions taken by said visitors, a message type, a message type and a corresponding alternative clicked on by a visitor, a web site and a section where the visitor was presented and saw a banner ad, a time of the visitors visit, a visitor demographic information, a visitor psychographic information, a visitor demographic profile, a visitor psychographic profile, and combinations thereof.

61. A computer program product as in claim 59, wherein said message alternatives are selected from a group consisting of: an email, an ad, a banner ad, a splash page, a home page, a jump page, a landing page, media programming, media content, a political campaign message, a survey, a poll, a news headline, a headline, a ballot measure, a ballot initiative, one or more sports scores, one or more sports scores for a local, regional, collegiate, or amateur sports team or teams, and combinations thereof.

62. The computer program product as described in claim 59 wherein the program module includes instructions for reducing the multiattribute system to a standard form such that (i) each multiattribute structure, except any null multiattribute structure, includes two or more attributes, (ii) each attribute includes at least two or more attribute values, (iii) for every attribute in each multiattribute structure at least two attribute values are assigned to message alternatives in that multiattribute structure, and (iv) a multiattribute mapping matrix for each multiattribute structure has full column rank.

* * * * *